(12) United States Patent
Yavuz et al.

(10) Patent No.: US 12,408,204 B2
(45) Date of Patent: Sep. 2, 2025

(54) USER EQUIPMENT, NETWORK NODE, AND METHODS PERFORMED THEREBY, FOR HANDLING FIRST INFORMATION

(71) Applicant: Telefonaktiebolaget LM Ericsson (publ), Stockholm (SE)

(72) Inventors: Emre Yavuz, Stockholm (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

(21) Appl. No.: 17/767,969

(22) PCT Filed: Mar. 5, 2020

(86) PCT No.: PCT/SE2020/050243
§ 371 (c)(1),
(2) Date: Apr. 11, 2022

(87) PCT Pub. No.: WO2021/071405
PCT Pub. Date: Apr. 15, 2021

(65) Prior Publication Data
US 2024/0098795 A1 Mar. 21, 2024

Related U.S. Application Data

(60) Provisional application No. 62/913,785, filed on Oct. 11, 2019.

(51) Int. Cl.
*H04W 74/0833* (2024.01)
(52) U.S. Cl.
CPC .............................. *H04W 74/0833* (2013.01)

(58) Field of Classification Search
CPC .................................................. H04W 74/0833
See application file for complete search history.

(56) References Cited

U.S. PATENT DOCUMENTS

| | | | |
|---|---|---|---|
| 2021/0014017 A1* | 1/2021 | Zhou | H04L 5/0007 |
| 2022/0015150 A1* | 1/2022 | Ye | H04W 74/0833 |
| 2022/0078872 A1* | 3/2022 | Shrestha | H04W 76/30 |
| 2022/0174775 A1* | 6/2022 | Rönneke | H04W 76/27 |

OTHER PUBLICATIONS

International Search Report and Written Opinion of the International Searching Authority for PCT International Application No. PCT/SE2020/050243 dated Jun. 30, 2020.

(Continued)

*Primary Examiner* — Won Tae C Kim
(74) *Attorney, Agent, or Firm* — Sage Patent Group

(57) ABSTRACT

A method performed by a user equipment. The method is for providing first information to a network node. The user equipment and the network node operate in a wireless communications network. The user equipment sends a first indication to the network node. The first indication indicates whether or not first information is being provided. The first information comprises at least one of: a) a quality report on a carrier used between the network node and the user equipment, and b) second information on subsequent transmissions from the user equipment to the network node or from the network node to the user equipment. The first indication is comprised in a payload of a Medium Access Control control element.

20 Claims, 11 Drawing Sheets

(56) References Cited

OTHER PUBLICATIONS

3GPP TS 24.301 V16.2.0, "3rd Generation Partnership Project; Technical Specification Group Core Network and Terminals; Non-Access-Stratum (NAS) protocol for Evolved Packet System (EPS); Stage 3 (Release 16)," Sep. 2019, 558 pages.
3GPP TS 36.300 V15.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Dec. 2018, 363 pages.
Ericsson, "RRC release after EDT for User Plane CIoT EPS optimization," R2-1913757, Revision of R2-1910897, 3GPP TSG-RAN WG2 #107bis, Chongqing, China, Oct. 14-18, 2019, 5 pages.
Ericsson, "RRC release assistance for Control and User Plane CIoT EPS optimizations," R2-1915772, Revision of R2-1913757, 3GPP TSG-RAN WG2 #108, Reno, NV, USA, Nov. 18-22, 2019, 6 pages.

\* cited by examiner a)
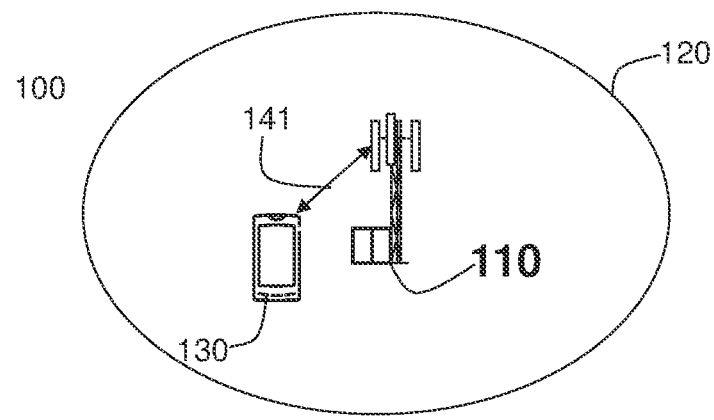
b)
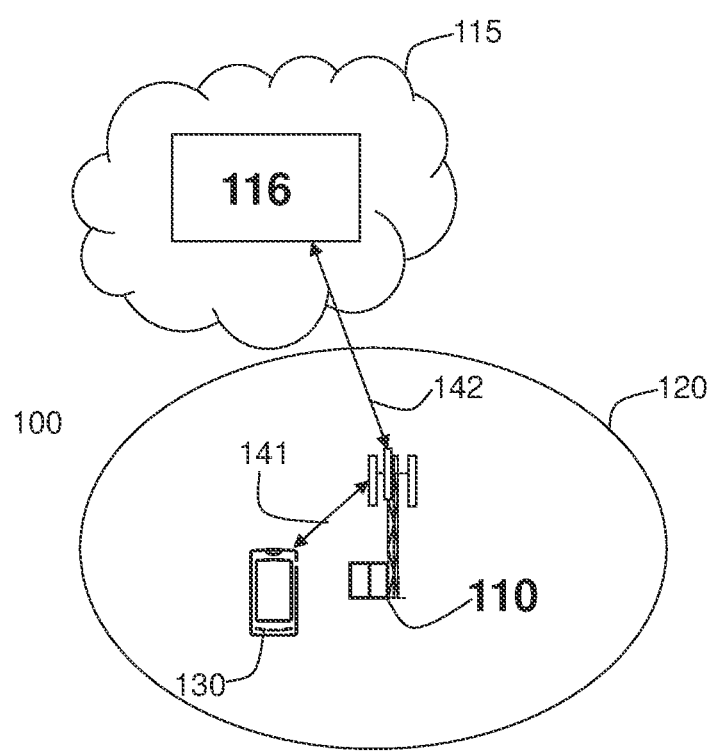
Figure 4 a)
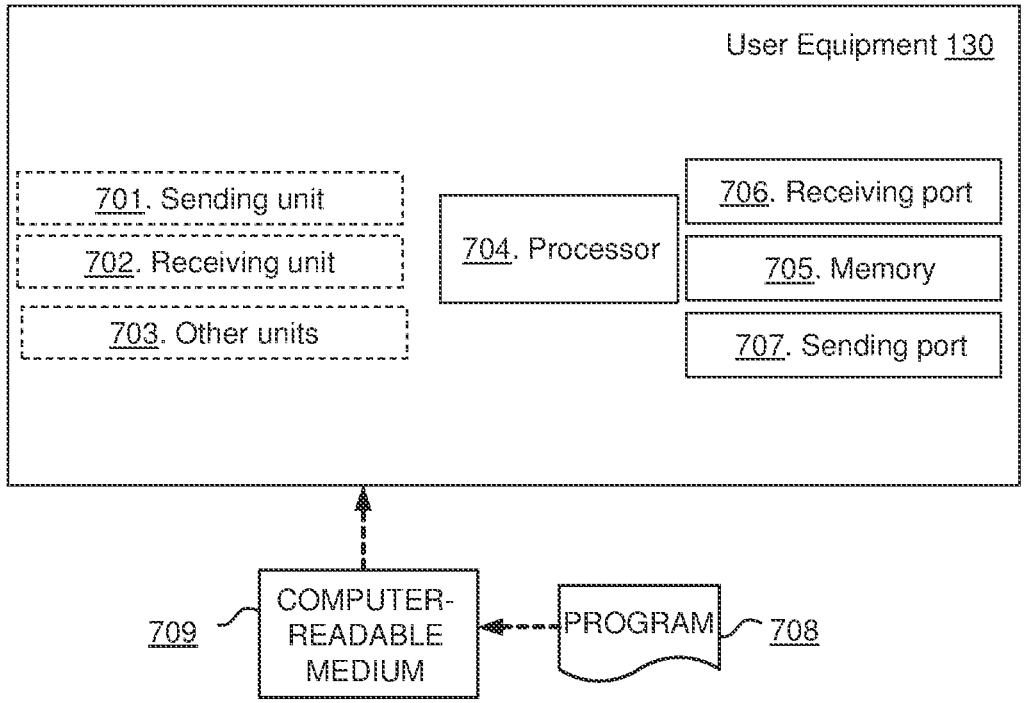
b)
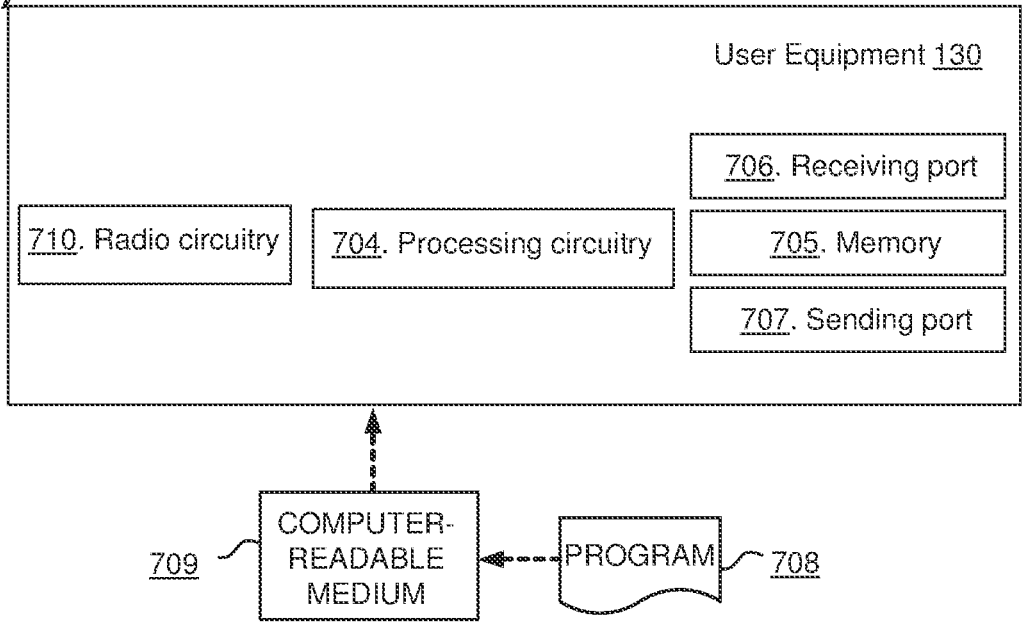
Figure 7

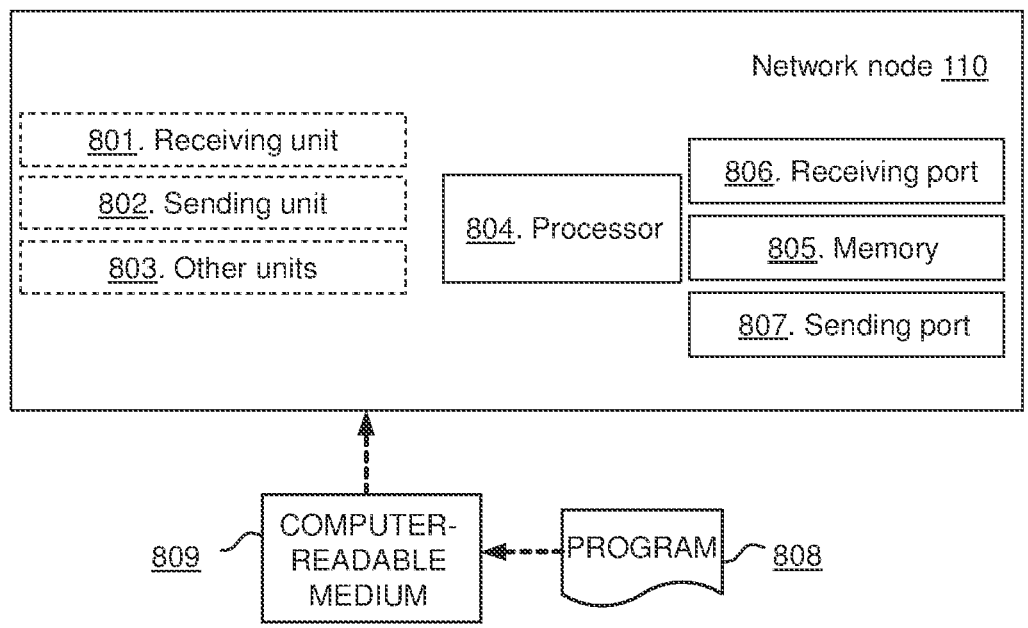
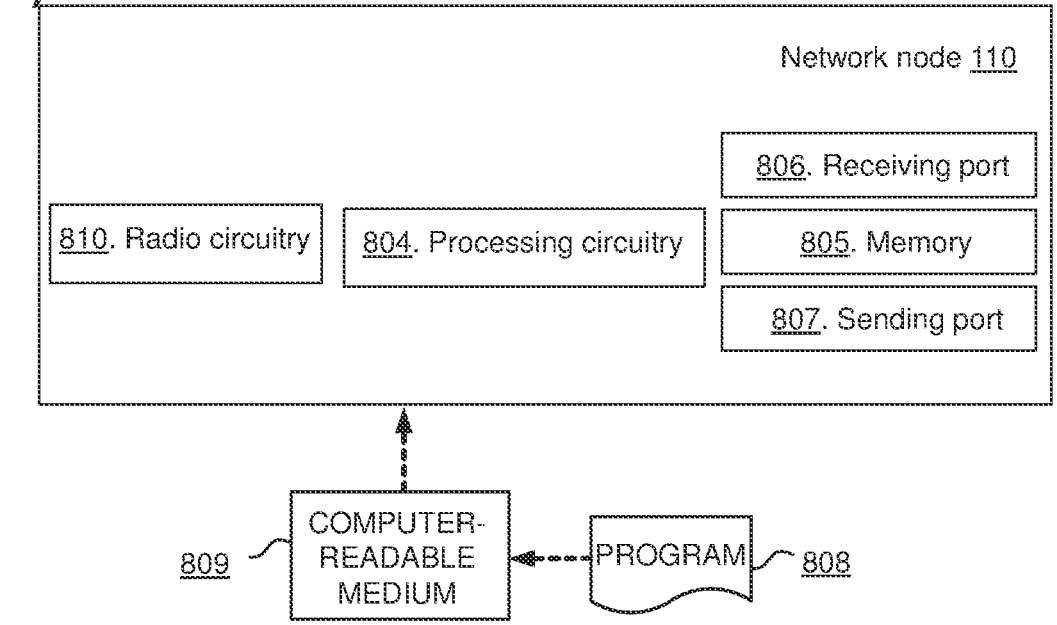
Figure 8

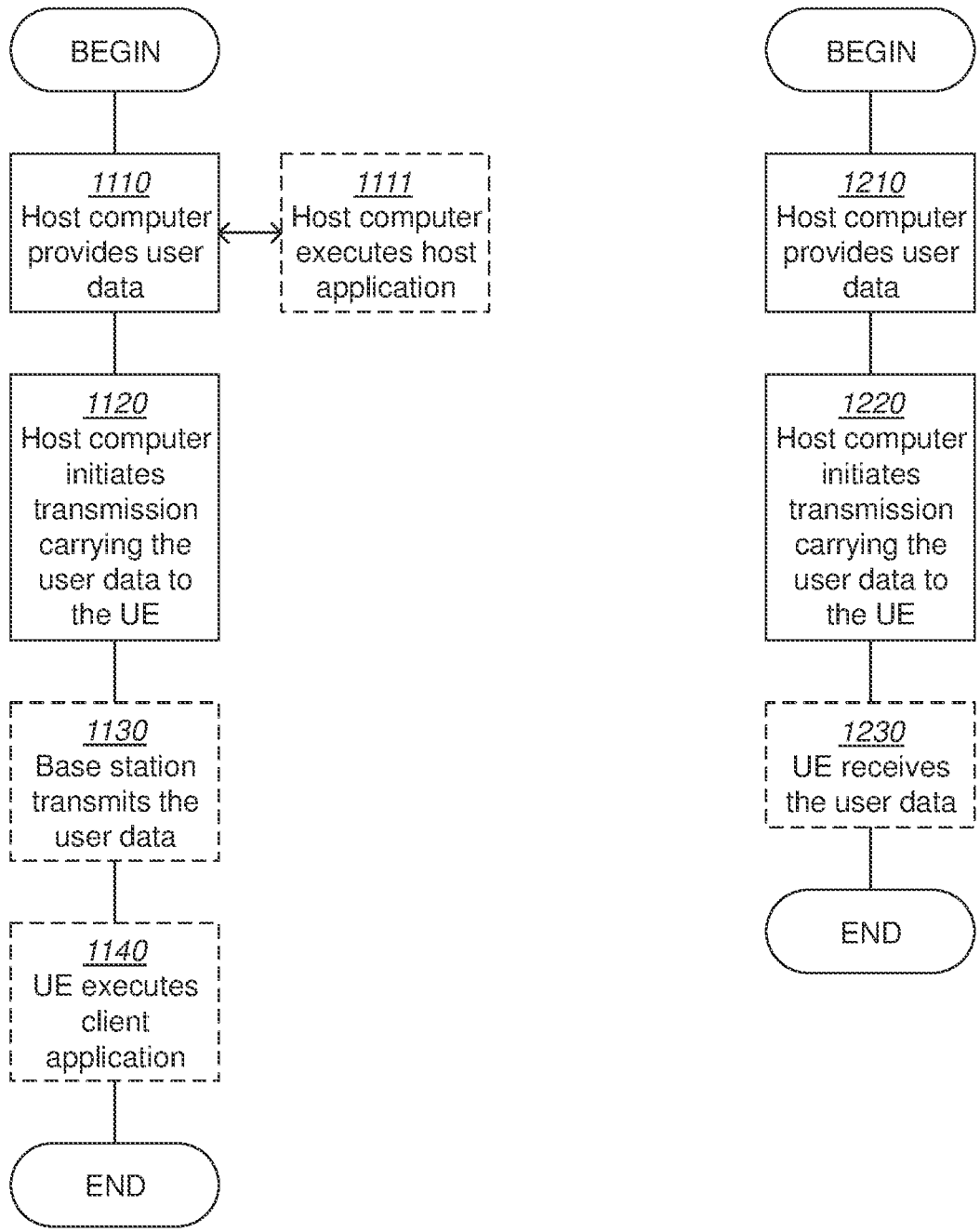

USER EQUIPMENT, NETWORK NODE, AND METHODS PERFORMED THEREBY, FOR HANDLING FIRST INFORMATION

CROSS REFERENCE TO RELATED APPLICATIONS

This application is a 35 U.S.C. § 371 national stage application of PCT International Application No. PCT/SE2020/050243 filed on Mar. 5, 2020, which claims the benefit of U.S. Provisional Patent Application Ser. No. 62/913,785, filed on Oct. 11, 2019, the disclosures and content of which are incorporated by reference herein in their entireties.

TECHNICAL FIELD

The present disclosure relates generally to a user equipment, and methods performed thereby, for providing first information to a network node. The present disclosure also relates generally to a network node, and methods performed thereby, for receiving first information from a user equipment.

BACKGROUND

User Equipments (UEs) within a wireless communications network may be e.g., wireless devices, stations (STAs), mobile terminals, wireless terminals, terminals, and/or Mobile Stations (MS). UEs are enabled to communicate wirelessly in a cellular communications network or wireless communication network, sometimes also referred to as a cellular radio system, cellular system, or cellular network. The communication may be performed e.g., between two UEs, between a wireless device and a regular telephone and/or between a wireless device and a server via a Radio Access Network (RAN) and possibly one or more core networks, comprised within the wireless communications network. UEs may further be referred to as mobile telephones, cellular telephones, laptops, or tablets with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., gNB, evolved Node B ("eNB"), "eNodeB", "NodeB", "B node", Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

The standardization organization 3GPP is currently in the process of specifying a New Radio Interface called NR or 5G-UTRA, as well as a Fifth Generation (5G) Packet Core Network, which may be referred to as Next Generation (NG) Core Network, abbreviated as NG-CN, NGC or 5G CN.

Internet of Things (IoT)

The Internet of Things (IoT) may be understood as an internetworking of communication devices, e.g., physical devices, vehicles, which may also referred to as "connected devices" and "smart devices", buildings and other items-embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g., a "smart" thermostat, ventilation, air conditioning, and appliances such as washers, dryers, ovens, refrigerators or freezers that may use telecommunications for remote monitoring. These devices may collect data with the help of various existing technologies and then autonomously flow the data between other devices.

It is expected that in a near future, the population of IoT devices will be very large. Various predictions exist, among which one assumes that there will be >60000 devices per square kilometer, and another assumes that there will be 1000000 devices per square kilometer. A large fraction of these devices are expected to be stationary, e.g., gas and electricity meters, vending machines, etc.

Machine Type Communication (MTC)

Machine Type Communication (MTC) has in recent years, especially in the context of the Internet of Things (IoT), shown to be a growing segment for cellular technologies. An MTC device may be a communication device, typically a wireless communication device or simply user equipment, that may be a self and/or automatically controlled unattended machine and that is typically not associated with an active human user in order to generate data traffic. An MTC device may be typically more simple, and typically associated with a more specific application or purpose, than, and in contrast to, a conventional mobile phone or smart phone. MTC involves communication in a wireless communication network to and/or from MTC devices, which communication typically may be of quite different nature and with other requirements than communication associated with e.g., conventional mobile phones and smart phones. In the context of and growth of the IoT, it is evident that MTC traffic will be increasing and thus may be understood to need to be increasingly supported in wireless communication systems.

3GPP has been working on specifying features to address Machine-to-Machine (M2M) and/or Internet of Things (IoT) related use cases. There has been also work to specify methods to reduce the overhead signalling in the network due to connection setup, e.g., Radio Resource Control (protocol) (RRC) connection suspend/resume.

In this document, LTE enhancements introduced in 3GPP Releases 13, 14, 15, and 16 for MTC are referred as enhanced Machine-Type Communications "eMTC", including, but not limited to, support for Bandwidth Limited (BL) UEs, e.g., Category M1 (Cat-M1) and Category M2 (Cat-M2), and non-BL UEs that support enhanced coverage.

For both eMTC and Narrowband Internet of Things (NB-IoT), 'Cellular IoT (CIoT) Evolved Packet System (EPS) User Plane (UP) optimization' and 'CIoT EPS Control Plane (CP) optimization' signalling reductions were introduced in Rel-13. The former, here referred to as "UP-solution", which may be understood to allow the UE to resume a previously suspended RRC connection since the UE Access Stratum (AS) context may be stored in the network, thus also known as RRC Suspend/Resume. The latter, here referred to as "CP-solution", may be understood to allow the transmission of user-plane data over Non-Access Stratum (NAS), a.k.a. Data over NAS (DoNAS).

In general, for 3GPP releases, the common goal for both eMTC and NB-IoT related enhancements, may be understood to be to reduce UE power consumption, and thus the intention may be understood to be to setup and release a connection as soon as possible to transmit the user plane data. In release 15, the following objectives were the motivation to introduce the feature "Early Data Transmission" (EDT).

From the work item (WI) eMTC (WI_eMTC), the objective was to support early data transmission with the following working groups to be responsible: RAN2 lead, RAN1, and RAN3. Particularly, the objective comprised to evaluate power consumption and/or latency gain, and specify necessary support for DL/UL data transmission on a dedicated resource during the Random Access (RA) procedure, after Physical Random Access CHannel (PRACH) transmission and before the RRC connection setup is completed, at least in the RRC Suspend/Resume case.

And from WI NBIoT (WI_NBIOT), the objective was to evaluate power consumption/latency gain, and specify necessary support for DL/UL data transmission on a dedicated resource during the Random Access (RA) procedure after Narrowband Physical Random Access Channel (NPRACH) transmission and before the RRC connection setup is completed, with the following working groups to be responsible: RAN2, RAN1, and RAN3.

To make the description of existing functionalities and proposed solution, the messages in the random-access (RA) procedure are commonly referred to as message 1 (Msg1) through message 4 (Msg4). The contention-based RA procedure is illustrated in FIG. 1. As schematically represented in the diagram of FIG. 1, when a UE wants to access the network, it may initiate the RA procedure by transmitting a preamble (Msg1) in the uplink at 1. At 2, an eNB receiving the preamble and detecting the random-access attempt may respond in the downlink by transmitting a random-access response (Msg2). The random-access response may carry an uplink scheduling grant for the UE to continue the procedure by transmitting, at 3, a subsequent message in the uplink (Msg3) for terminal identification. At 4, the eNB may send a message (Msg4) indicating contention resolution back to the UE.

Early Data Transmission (EDT) for CP Optimization

The early data transmission (EDT) procedure for Control Plane CIoT EPS optimization is illustrated as a schematic diagram in FIG. 2, according to subclause 7.3b.1 in [1]. In mobile originated data transport using Control Plane CIoT EPS Optimisation, a UE may establish an RRC connection or send the RRCEarlyDataRequest (EDT) message. At 20, the may initiate the RA procedure by transmitting a preamble to the eNB. The eNB, at 21, may then respond by transmitting a random-access response. At 22, the UE sends an RRC EarlyDataRequest to the eNB, which may comprise a System Architecture Evolution-Temporary Mobile Subscriber Identity (S-TMSI), an establishment cause, and dedicated information (Info) for the NAS layer. The UE may also indicate Release Assistance Information in the NAS Protocol Data Unit (PDU) (NAS RAI), that is, to indicate whether no further uplink or downlink data transmissions are expected, or only a single downlink data transmission, e.g., acknowledgement or response to uplink data, subsequent to this uplink data transmission is expected. The purpose of RAI may be understood to be to enable to indicate to the network that e.g., no further data is expected in the UL/DL, or a single transmission of data is expected to be transmitted in the DL as a response, so that the UE may be released as early as possible. At 23, the eNB may indicate to Mobility Management Entity (MME) that a connection is triggered for EDT with the S1-AP Initial UE message. At 24, the MME requests the S-GW to re-activate the EPS bearers for the UE. At 25, the MME sends the uplink data to the S-GW. If downlink data is available, a Serving GateWay (S-GW) may send the downlink data to the MME at 26. When data is received, the MME may forward the data to the eNB via a DL NAS Transport procedure at 27a. At 27b, the MME may trigger a Connection Establishment Indication procedure and/or indicate whether further data is expected. At 28, the eNB sends an RRCEarlyDataComplete message to the UE indicating an acknowledgement that RRCEarlyDataRequest message has been received and providing data in the DL, if available. If no downlink data is expected based on the Release Assistance Information from the UE, this may be understood to mean that all application layer data exchanges have been completed with the UL data transfer, and if the MME is not aware of any pending Mobile Terminated (MT) traffic and S1-U bearers are not established, the MME may signal the S1-AP UE Context Release Command to the eNB at 29a. If the Release Assistance Information was received with uplink data and it indicated that downlink data was expected, it means a downlink packet following the transmission of Release Assistance Information is the last packet of the application layer data exchange. For this case, unless the MME is aware of additional pending MT traffic and S1-U bearers are established, the MME may send an S1 UE Context Release Command immediately after the S1-AP message including the downlink data encapsulated in NAS PDU as an indication that eNB may need to release the RRC connection promptly after successfully sending data to the UE. If an "EDT Session" indication was received, it may also be possible that the MME may include the "end indication" for no further data in the S1-AP message including the downlink data encapsulated in NAS PDU. At 29b, the EPS bearers are deactivated.

EDT for UP Optimization

The early data transmission (EDT) procedure for User Plane CIoT EPS optimization is illustrated as a schematic diagram in FIG. 3, according to subclause 7.3b.3 in [1]. Steps 20 and 21 are the same as those described for FIG. 2. At 30, the UE may send the RRCConnectionResumeRequest message to the eNB, including its Resume IDentifier (ID), establishment cause, and an authentication token. The UE may resume all Signalling Radio Bearers (SRBs) and Data Radio Bearers (DRBs), derive new security keys using the NextHopChainingCount provided in the RRCConnectionRelease message of the previous connection and re-establish the Access Stratum (AS) security. The user data may be ciphered and transmitted on a Dedicated Traffic Channel (DTCH) multiplexed with the RRCConnectionResumeRequest message on Common Control Channel (CCCH). However, it is not possible for the UE to provide an indication similar to the Release Assistance Information in a NAS Protocol Data Unit (NAS PDU) to indicate whether no further uplink or downlink data transmissions are expected, or only a single downlink data transmission, e.g. acknowledgement or response to uplink data, subsequent to this uplink data transmission is expected. At 31, the eNB may initiate the S1-AP Context Resume procedure to resume the S1 connection and re-activate the S1-U bearers. At 32, the MME may request the S-GW to re-activate the S1-U bearers for the UE. At 33, the MME may confirm the UE context resume to the eNB and it may be aware of any MT-signalling/data that may have been received previously. But the MME may not be aware of the service, that is, to the application which led to data transmission in the UL in the first place, and does not know if there will be DL data triggered at this point. At 34, the uplink data may be delivered to the S-GW. If downlink data are available, the S-GW may send the downlink data to the eNB at 35. If no further data is expected from the S-GW, the eNB may initiate the suspension of the S1 connection at 36 and the deactivation of the S1-U bearers at 37. Neither the eNB nor the MME has any knowledge if there will be data in the DL to transmit or if DL data will be triggered with the transmission in the UL. Therefore, there is no reason for the MME to provide the "pending" flag in S1 suspend response in this case. Note that the eNB may also decide to release the UE completely and S1 UE context Release Request may be sent. At 38, the eNB may send the RRCConnectionRelease message to keep the UE in RRC_IDLE. The message may include the releaseCause set to RRC-Suspend, the resumeID, the NextHopChainingCount (NCC), and downlink data it was received in step 35.

AS RAI is not reflected in EDT for UP CIoT EPS optimization. For User Plane CIoT EPS optimization, it is therefore not clear how the eNB may be able to make the decision after Msg3, that is, after the RRC Connection Resume Request, if the RRC connection may be released/suspended with Msg4, that is, with an RRC Connection Release, or if the RRC connection may need to be established with an Msg4 RRC Connection Resume. If the UE uses the EDT as an implicit AS RAI indication in itself, e.g. for a single UL packet, the flow provided in [1], which shows DL data, is not correct. That is, it would not be possible for the network to know whether the UE expects DL transmission due to the transmission in the UL or single/multiple transmissions in the DL as a response. Furthermore, it is not clear how eNB may be able to distinguish a dual UL+DL packet from a single packet, and from transmissions that may generate multiple packets. That is, the eNB would need to wait before releasing the UE to idle mode and therefore cause more power consumption.

RAI has been introduced in RAN2 implicitly. This may be understood to mean that, e.g., the UE may send e.g., a Buffer Status Report (BSR)=0, which implicitly indicates that there is nothing more to transmit in the UL. However, the captured mechanism is a pure "UL buffer empty" indication which does not originate with application layer information, that is, such indication would just reflect the status from MAC layer standpoint, not the application layer, and it does not support the RAI values defined for NAS. That is, when NAS RAI is introduced, possible indications may be no further data in the UL/DL, and single transmission in the DL as a response to the UL To indicate this is not possible with BSR=0. To support the eNB to make the RRC connection handling decision of whether to release/suspend the connection or to establish it as early as possible, AS RAI has been proposed to be introduced from UE to RAN with values similar to the ones defined for NAS.

The UE may include this parameter, that is, AS RAI, to inform the network whether: a) no subsequent DL and UL data transmission is expected, or b) a single subsequent DL transmission is expected; or c) multiple subsequent data transmissions are expected in the DL and/or UL. However, adding the signalling of such a parameter may increase the overhead, power consumption, and latency gain of the network, going against the main objective behind the introduction of EDT.

SUMMARY

It is an object of embodiments herein to provide a method for handling interference and usage of resources in a wireless communications network. It is a particular object of embodiments herein to provide a method for handling first information. Handling may be, e.g., a user equipment sending the first information to a network node. Likewise, handling may be, e.g., a network node receiving the first information from the user equipment.

According to a first aspect of embodiments herein, the object is achieved by a method performed by a user equipment. The method is for providing first information to a network node. The user equipment and the network node operate in a wireless communications network. The user equipment sends a first indication to the network node. The first indication indicates whether or not first information is being provided. The first information comprises at least one of: a) a quality report on a carrier used between the network node and the user equipment and b) second information on subsequent transmissions from the user equipment to the network node, or from the network node to the user equipment. The first indication is comprised in a payload of a Medium Access Control (MAC) control element (CE).

According to a second aspect of embodiments herein, the object is achieved by a method, performed by the network node. The method is for receiving the first information from the user equipment. The network node and the user equipment operate in the wireless communications network. The network node receives the first indication from the user equipment. The first indication indicates whether or not the first information is being provided. The first information comprises at least one of: a) the quality report on the carrier used between the network node and the user equipment and b) the second information on subsequent transmissions from the user equipment to the network node, or from the network node to the user equipment. The first indication is comprised in the payload of the MAC CE.

According to a third aspect of embodiments herein, the object is achieved by the user equipment. The user equipment is for providing the first information to the network node. The user equipment and the network node are configured to operate in the wireless communications network. The wireless device is further configured to send the first indication to the network node. The first indication is configured to indicate whether or not the first information is being provided. The first information is configured to comprise at least one of: a) the quality report on the carrier configured to be used between the network node and the user equipment, and b) the second information on subsequent transmissions from the user equipment to the network node, or from the network node to the user equipment. The first indication is configured to be comprised in the payload of the MAC CE.

According to a fourth aspect of embodiments herein, the object is achieved by the network node. The network node is for receiving the first information from the user equipment. The network node and the user equipment are configured to operate in the wireless communications network. The network node is further configured to receive the first indication from the user equipment. The first indication is configured to indicate whether or not the first information is being provided. The first information is configured to comprise at least one of: a) the quality report on the carrier used between the network node and the user equipment, and b) the second information on subsequent transmissions from the user equipment to the network node, or from the network node to the user equipment. The first indication is configured to be comprised in the payload of the MAC CE.

By sending the first indication indicating whether or not the quality report and/or the second information is being provided using the MAC CE payload, the user equipment is enabled to indicate to the network node, whether or not the second information on subsequent transmissions is being provided, with no need to extend the size of RRC and/or MAC layer messages, or reserve a new LCID. Hence, the user equipment is enabled to achieve the benefits afforded by providing the second information to the network node, while avoiding wastage of resources, without causing unnecessary additional overhead, or usage of the limited LCID values. This is because by sending the first information, the user equipment enables the network node to interpret the MAC CE correctly, and determine whether the quality report is provided, the second information is provided, neither of them, or both. By indicating whether the second information is being provided, the network node is then enabled to interpret the MAC CE, read the second information, if provided, and make a decision on its connection with the user equipment.

BRIEF DESCRIPTION OF THE DRAWINGS

Examples of embodiments herein are described in more detail with reference to the accompanying drawings, according to the following description.

FIG. 4 is a schematic diagram an example of a wireless communications network, according to embodiments herein.

FIG. 7 is a schematic block diagram illustrating embodiments of a user equipment, according to embodiments herein.

FIG. 8 is a schematic block diagram illustrating embodiments of a network node, according to embodiments herein.

FIG. 11 is a flowchart depicting embodiments of a method in a communications system including a host computer, a base station and a user equipment, according to embodiments herein.

FIG. 12 is a flowchart depicting embodiments of a method in a communications system including a host computer, a base station and a user equipment, according to embodiments herein.

DETAILED DESCRIPTION

Figure 1:
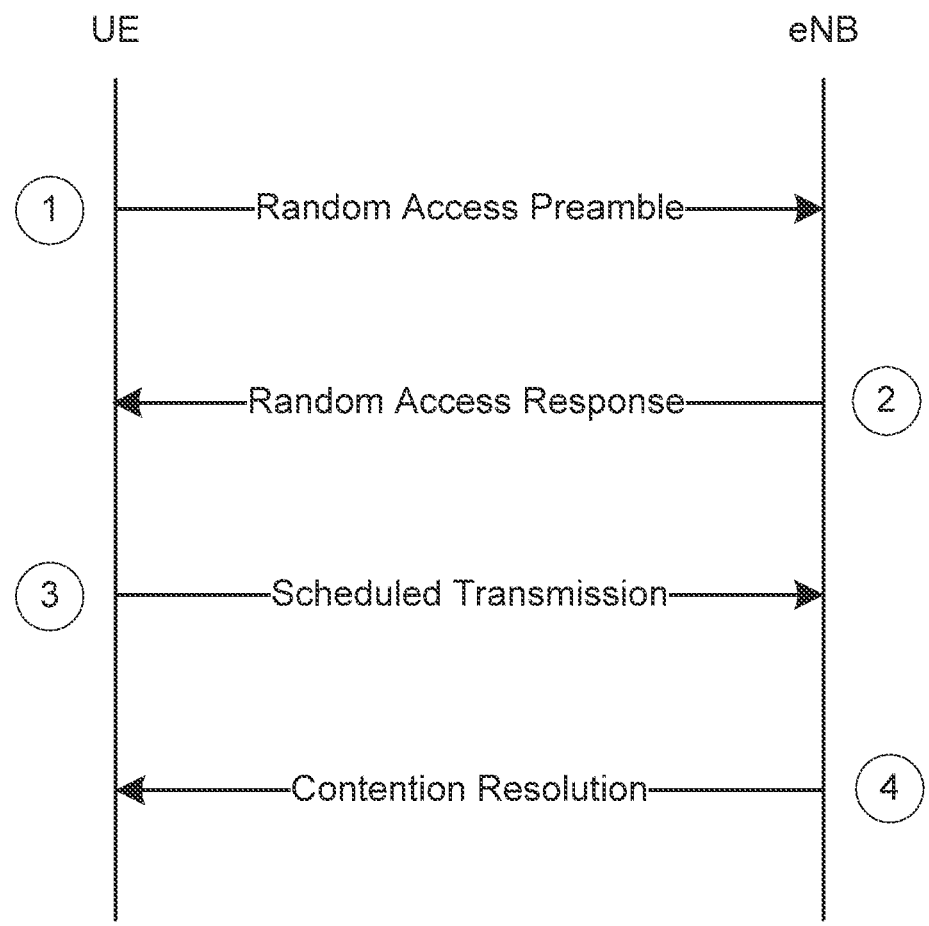
FIG. 1 is a schematic signalling diagram illustrating an example of a contention-based RA procedure.
Figure 2:
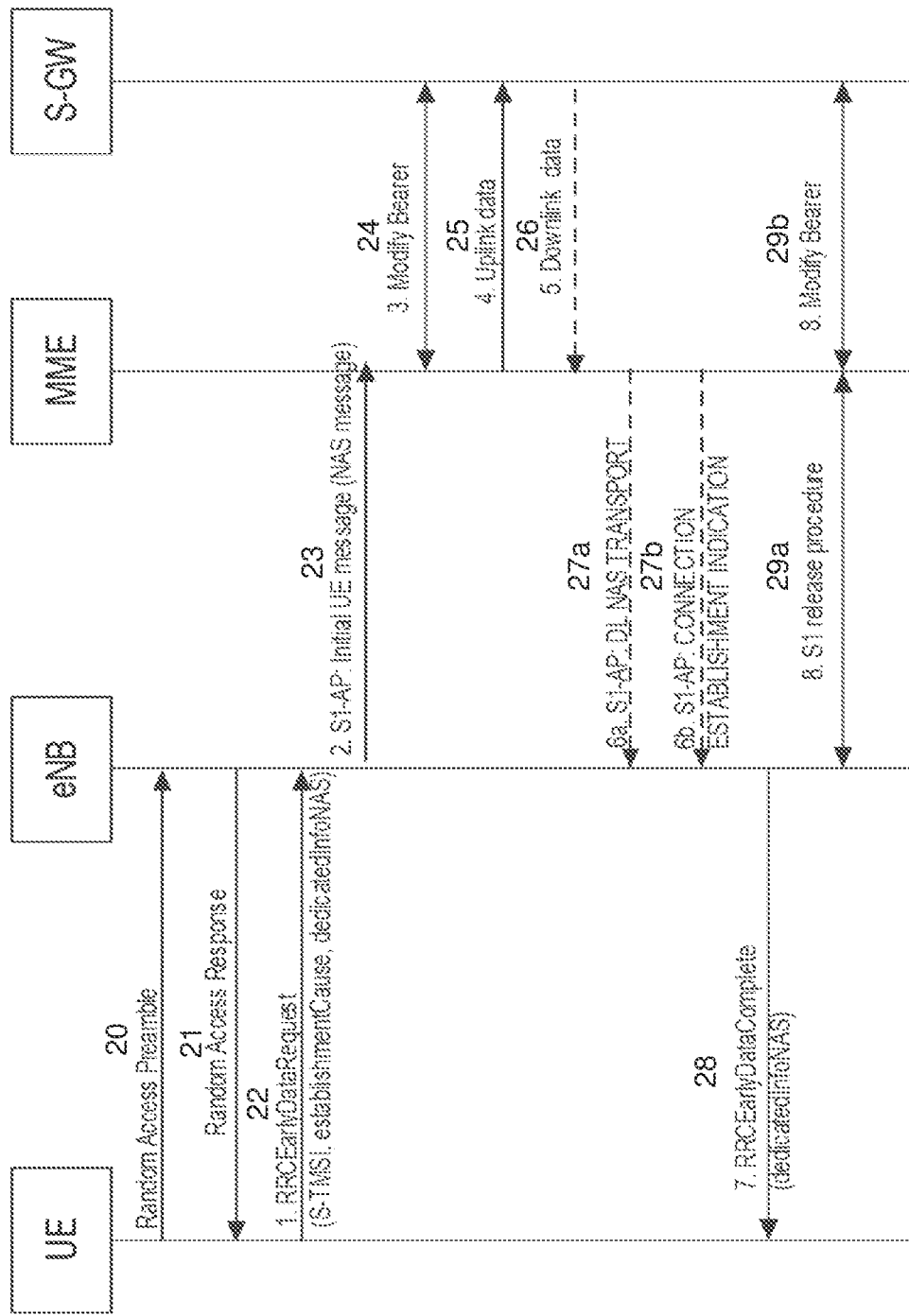
FIG. 2 is a schematic signalling diagram illustrating an example of EDT for Control Plane CIoT EPS Optimizations.
Figure 3:
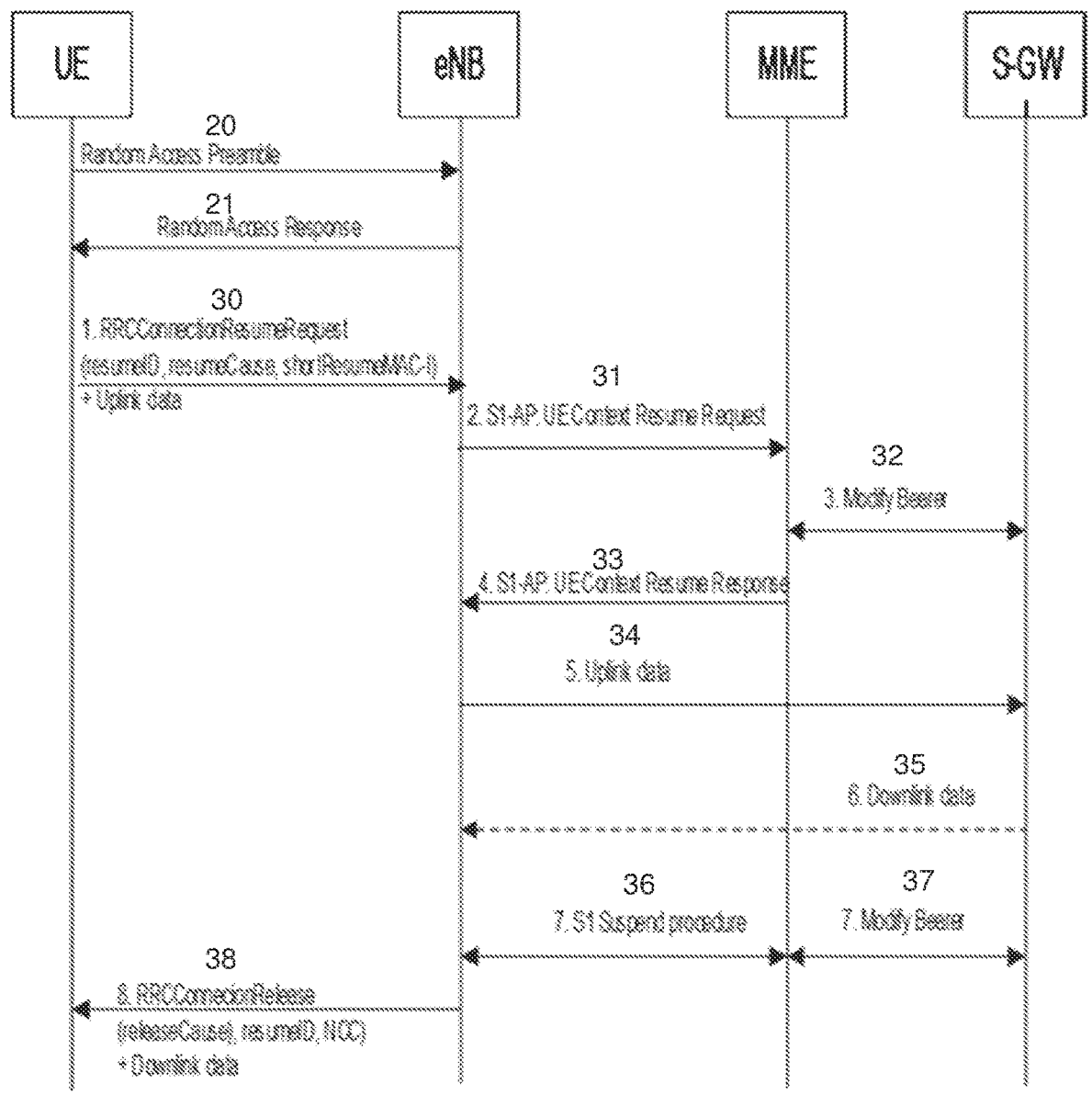
FIG. 3 is a schematic signalling diagram illustrating an example of EDT for User Plane CIoT EPS Optimizations.

As part of the development of embodiments herein, one or more challenges with the existing technology will first be identified and discussed.

As stated in the background section, to support the eNB to make the RRC connection handling decision about the RRC connection with or without suspend, or complete establishing the RRC connection as early as possible, AS RAI has been proposed to be introduced from the UE to the RAN, with values similar to the ones defined for NAS.

Considering that such information would be beneficial, it would be advantageous to introduce AS RAI for RRC Suspend/Resume and EDT procedures for both eMTC and NB-IoT.

The problem that arises then how to signal the AS RAI efficiently, without increasing the signalling overhead, and therefore increasing the usage of energy and processing resources of the devices involved.

I addition, regarding the UE informing the network whether multiple subsequent data transmissions are expected in the DL and/or the UL, it may be noted that there is a difference between knowing that there will be multiple transmissions, that is, that the eNB should move the UE to connected mode, and not knowing anything. In NAS RAI, which has been specified in TS 24.301, no indication would be sent if multiple packets are expected.

To inform the network about the cases, a), b) and c) mentioned above in the Background section, 3 code points may be needed, which may be understood to require 2 bits. The problem is whether those bits, which would indicate AS RAI, may need to be provided in MAC or RRC, and whether there may be enough spare and/or reserved bits and/or codepoints that may be used to send the indication.

For eMTC, in the RRCConnectionResumeRequest message, for both EDT and non-EDT cases, only 1 spare bit is available. For the RRCEarlyDataRequest message, 2 spare bits may easily be allocated for the AS RAI. There is also 1 spare bit in the Medium Access Control (MAC) sub header, but it may need to be combined with the spare bit in RRC to create the 2-bit parameter for the indication. However, such combination is not preferred considering architectural design principles for layers. Another possibility is to extend the RRC connection resume request message or to introduce a new MAC sub header for this 2-bit indication, but in either case the RRC or the MAC message would need to be extended in size. The motivation may be understood to be to avoid creating such new indications so that, e.g., the number of padding bits for those that do not support the feature, especially considering the legacy UEs, would not increase due to the need to provide UL grants with larger Transport Block Size (TBS) for transmission in the UL otherwise.

In MAC, it may be possible to introduce a new MAC Control Element (MAC CE) with a fixed length. But this would require a new Logical Channel IDentifier (LCID) value for the corresponding MAC sub header. Considering that reserved LCID values are quite limited, this does not seem to be an efficient way to send the indication either.

Certain aspects of the present disclosure and their embodiments may provide solutions to these or other challenges. Embodiments herein may be generally understood to relate to a method for signalling an Access Stratum Release Assistance Indicator (AS RAI). More particularly, in embodiments herein, a solution is proposed regarding how to indicate AS RAI, which may be understood to require 2 bits, in Msg3, without a need to extend the size of RRC and/or MAC layer in the message.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

FIG. 4 depicts two non-limiting examples of a wireless network or wireless communications network 100, sometimes also referred to as a wireless communications system, cellular radio system, or cellular network, in which embodiments herein may be implemented. The wireless communications network 100 may typically be a 5G system, 5G network, or Next Gen System or network. In particular examples, the wireless communications network 100 may support NR operating in unlicensed spectrum (NR-U). In other examples, the wireless communications network 100 may support NR operating in licensed spectrum. In other examples, the wireless communications network 100 may instead, or in addition, support other technologies such as, for example, Long-Term Evolution (LTE), e.g. LTE for Machines (LTE-M), LTE Frequency Division Duplex (FDD), LTE Time Division Duplex (TDD), LTE Half-Duplex Frequency Division Duplex (HD-FDD), LTE operating in an unlicensed band, such as LTE Licensed Assisted Access (LAA), enhanced LAA (eLAA), further enhanced LAA (feLAA) and/or MulteFire. Yet in other examples, the wireless communications network 100 may support other technologies such as, for example eMTC, NB-IoT, IoT, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system. In some embodiments, the wireless communications network 100 may support at least one of: New Radio (NR), Long Term Evolution (LTE), LTE-M, enhanced Machine Type Communication (eMTC), and Narrow Band Internet of Things (NB-IoT).

The wireless communications network 100 comprises a plurality of network nodes, whereof a network node 110 is depicted in the non-limiting example of FIG. 4. The network node 110 is a radio network node. That is, a transmission point such as a radio base station, for example a gNB, an eNB, an eNodeB, or a Home Node B, a Home eNode B, or any other network node with similar features capable of serving a user equipment, such as a wireless device or a machine type communication device, in the wireless communications network 100. In some examples, such as that depicted in FIG. 4 b, the network node 110 may be a distributed node, and may partially perform its functions in collaboration with a virtual node 116 in a cloud 115.

The wireless communications network 100 may cover a geographical area, which in some embodiments may be divided into cell areas, wherein each cell area may be served by a radio network node, although, one radio network node may serve one or several cells. In the example of FIG. 4, the network node 110 serves a cell 120. The network node 110 may be of different classes, such as, e.g., macro eNodeB, home eNodeB or pico base station, based on transmission power and thereby also cell size. In some examples, the network node 110 may serve receiving nodes with serving beams. The radio network node may support one or several communication technologies, and its name may depend on the technology and terminology used. Any of the radio network nodes that may be comprised in the communications network 100 may be directly connected to one or more core networks.

A plurality of user equipments may be located in the wireless communication network 100, whereof a user equipment 130, is depicted in the non-limiting example of FIG. 4. The user equipment 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the user equipments comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, IoT device, NB-IoT device, device equipped with a wireless interface, such as a printer or a file storage device, modem, or any other radio network unit capable of communicating over a radio link in a communications system. The user equipment 130 comprised in the wireless communications network 100 may be enabled to communicate wirelessly in the wireless communications network 100. The communication may be performed e.g., via a RAN, and possibly the one or more core networks, which may comprised within the wireless communications network 100.

The user equipment 130 may be configured to communicate within the wireless communications network 100 with the network node 110 over a first link 141, e.g., a radio link. The network node 110 may be configured to communicate within the wireless communications network 100 with the virtual network node 116 over a second link 142, e.g., a radio link or a wired link.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second" and/or "third" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a user equipment, such as the user equipment 130, e.g., a 5G UE, and embodiments related to a network node, such as the network node 110, e.g., a gNB.

Some embodiments herein will now be further described with some non-limiting examples.

In the following description, any reference to a/the UE, or simply "UE" may be understood to equally refer the user equipment 130; any reference to a/the gNBs, and/or a/the network may be understood to equally refer to the network node 110.

A method, performed by a user equipment, such as the user equipment 130 is described herein. The method may be understood to be for handling first information with a network node 110, such as the network node 110. The user equipment 130 and the network node 100 may be operating in the wireless communications network 100.

A method, performed by a network node, such as the network node 110 is described herein. The method may be understood to be for handling first information with a user equipment, such as the user equipment 130, in a wireless communications network, such as the wireless communications network 100. The network node 110 and the user equipment 130 may be operating in the wireless communications network 100.

Embodiments of method, performed by the user equipment 130, will now be described with reference to the flowchart depicted in FIG. 5. The method may be understood to be for providing first information to the network node 110. The user equipment 130 and the network node 100 operates in the wireless communications network 100.

In some embodiments, the wireless communications network 100 may support at least one of: NR, LTE, LTE-M, eMTC, and NB-IoT.

The method may comprise one or more of the following actions. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. A non-limiting example of the method performed by the user equipment 130 is depicted in FIG. 5. In FIG. 5, an optional action is represented with dashed lines.

Action 501

As stated earlier, it may be beneficial, in order to save resources, such as battery, for the network node 110 to release a connection with the user equipment 130 as soon as possible, if there is no data for the user equipment to 130 transmit or to receive. As soon as possible may be even before the connection is fully established, e.g., during a random access procedure.

In order to help the network node 110 decide whether to release or suspend a connection with the user equipment 130, or to continue to establish it as soon as possible, e.g., during random access, the user equipment 130 may indicate to the network node 110 whether or not it is expecting to receive or send subsequent transmission. In order to provide this indication to the network node 110, in Medium Access Control (MAC), as mentioned earlier, any MAC Control Element (MAC CE) may be understood to require a new LCID value for the corresponding MAC sub header, which is not desirable given that reserved LCID values are quite limited.

It may be possible to consider sharing an LCID value in the corresponding MAC sub header with one of the existing LCID values, or use extended LCID (eLCID), which may be understood to require an even larger Transport Block Size (TBS), e.g. 24 bits instead 16 bits, due to the larger MAC sub header.

For the former option, it may be possible to consider sharing an LCID value with the one used for the MAC CE which has been introduced to provide e.g., quality report in Msg3. This may be possible considering that there may be 4 spare bits in that MAC CE, of which 2 spare bits may be used for AS RAI.

According to the foregoing, in this Action 501, the user equipment 130 sends a first indication to the network node 110. The first indication indicates whether or not first information is being provided. The first information comprises at least one of: a) a report on a quality, or "a quality report", on a carrier used between the network node 110 and the user equipment 130, and b) second information on subsequent transmissions from the user equipment 130 to the network node 110 or from the network node 110 to the user equipment 130.

The first indication is comprised in a payload of a Medium Access Control (MAC) control element (CE).

The second information may be Access Stratum Release Assistance Information (AS RAI).

The first indication may indicate whether or not the first information is being provided in the MAC CE. The quality report may require 4 of the 8 bits in a MAC CE. As stated earlier, there may be 4 spare bits in that MAC CE, of which 2 spare bits may be used for the second information, e.g., for AS RAI.

In some embodiments, the second information on subsequent transmissions may indicate at least one of the following: i) that no subsequent downlink (DL), and uplink (UL) data transmission is expected, ii) that a single subsequent DL transmission is expected, and iii) that multiple subsequent data transmissions are expected in the DL and/or in the UL. Examples of option iii) may include: that one subsequent data transmission is expected in the UL and one in the DL, that one subsequent data transmission is expected in the DL and one in the UL, that multiple subsequent data transmissions are expected in the UL, that multiple subsequent data transmissions are expected in the DL, or that that multiple subsequent data transmissions are expected in the UL and in the DL.

The quality report may be understood as a DL channel quality report. The channel may be, in non-limiting examples, e.g., Physical Downlink Control Channel (PDCCH), Narrowband PDCCH (nPDCCH), and/or MTC PDCCH (mPDCCH).

In some examples, the quality report, for NB-IoT, may be a report on one of an anchor or non-anchor carriers used during a random access procedure.

In other examples, the quality report may be provided when in connected mode.

The MAC CE may be comprised in a first uplink data channel during a random access procedure. In some embodiments, the MAC CE may be comprised in a MAC message PDU, e.g., an Msg3 message. Accordingly, in some embodiments, the MAC CE may be comprised in an Msg3 message. This may be understood to enable to provide the second information to the network node 110 advantageously early enough to enable the network node 110 to take a fast decision on the connection it may be establishing with the user equipment 130.

The sending in this Action 501 may be implemented, e.g., via the first link 141.

The sending in this Action 501 may be performed in/during a Suspend/Resume procedure.

In some embodiments, the sending in this Action 501 may be performed in a Suspend state. In some examples, the sending in this Action 501 may be performed when the user equipment 130 is suspended.

In other non-limiting examples, the sending in this Action 501 may be performed in an Idle state and/or in an Inactive state.

Yet in other examples, the sending in this Action 501 may be performed in a Connected state. Hence, in other examples, the MAC CE may be comprised in an uplink data channel when in connected mode.

Using 2 spare bits in the MAC CE which has been introduced to provide the quality report in Msg3 to transmit the second information may be understood to be advantageous. The MAC CE may be in total 8 bits. Four bits are used for the quality report, 2 bits may be used for AS RAI, which would leave 2 spare bits. However, this may couple these features unnecessarily. That is, either if no quality report is transmitted, then the whole CE, and therefore the AS RAI would not be transmitted either, or the other way around, that is, both would have to be transmitted. Therefore, in order to avoid that, either the 2 other spare bits or one of the 2 other spare bits and 1 (unused) code point in the parameter for AS RAI may be used. For example R=0, and codepoint 00 may indicate only quality report, whereas with any of the other codepoint may indicate both quality report and AS RAI are provided. R=1 may indicate no quality report which may be understood to mean only AS RAI exists if any of the non-zero codepoints is used. This may enable the user equipment 130 to send the second information, e.g., the AS RAI, to network node 110, while at the same time, to enable the network node 110 to interpret the content of the MAC CE correctly upon receipt, without the need to use another LCID value.

With the purpose of addressing the foregoing, the first indication may comprise a first value and a second value.

In some embodiments, the first value may be an unassigned or, available or, spare value (unassigned/available/spare value), and the second value may be a codepoint.

The unassigned/available/spare value may be, e.g., a Reserved (R) value.

The quality report may require 4 of the 8 bits in a MAC CE. The second value may be one of the codepoints, that is, 00, out of 4, which may require 2 of the other 4 bits available, that is unassigned or spare bits, referred to herein as available/unassigned/spare bits, in the MAC CE to transmit the second information, e.g., the AS RAI.

In other words, of the 8 bits in the MAC CE, four bits may be allocated to send the quality report, 2 bits of the remaining 4 bits, may be allocated to send the second information, e.g., the AS RAI. The other 2 bits may then be used as the first value. Accordingly, the MAC CE may comprise the first indication and at least one of: the quality report, and the second information.

The codepoint may be, for example, 1 (unused) code point in the parameter for AS RAI. Since there may be 2 bits for AS RAI, there may be four codepoints: 00, 01, 10, and 11, and only three may be necessary for the AS RAI, which may leave a fourth codepoint free for use for another purpose.

In some examples of this Action 501, the quality report and the second information may be sent. In other examples, the quality report may be sent, but not the second information. In further examples, the second information may be sent without the quality report. In yet further examples, neither the quality report nor the second information may be sent.

Based on the foregoing, in some embodiments, at least one of the following may apply: a) an unassigned/available/spare value of 0 and a codepoint value of 0 may indicate that the second information on subsequent transmissions is not being sent, and only the quality report is being sent, b) an unassigned/available/spare value of 0 and a codepoint value different than 0 may indicate that both of the second information on subsequent transmissions and the quality report are being sent, and c) an unassigned/available/spare value of 1 may indicate that the second information on subsequent transmissions is being sent without a quality report.

In some embodiments, option a) may apply. In other embodiments, option b) may apply. Yet in other embodiments, option c) may apply.

However, given the rationale provided above, it may be understood that other combinations of the first value and the second value may be similarly used to achieve the same purpose. For example, in some other examples, at least one of the following may apply: a) a first value of 0 and a second value different than 0 may indicate that the second information on subsequent transmissions is being sent without a quality report, b) a first value different than 0 and a second value different than 0 may indicate that both of the second information on subsequent transmissions and the quality report are being sent, c) a first value different than 0 and a second value of 0 may indicate that the second information on subsequent transmissions is not being sent, and only the quality report is being sent, and d) a first value of 0 and a second value of 0 indicate that neither the second information on subsequent transmissions nor the quality report is being sent.

With the Early Data Transmission feature, there may be a contention-based transmission of the payload, that is, there may be a risk for collision of transmissions from the user equipment 130 with transmissions from other UEs, which may lead to high numbers of retransmission and congestion upon high load in a cell, e.g., the cell 120. By sending the first indication indicating whether or not the quality report and/or the second information is being provided using the MAC CE payload, the user equipment 130 is enabled to indicate to the network node 110, whether or not the second information on subsequent transmissions is being provided, with no need to extend the size of RRC and/or MAC layer messages, or reserve a new LCID. Hence, the user equipment 130 is enabled to achieve the benefits afforded by providing the second information to the network node 110, while avoiding wastage of resources, without causing unnecessary additional overhead, or usage of the limited LCID values. This is because by sending the first information, the user equipment 130 enables the network node 110 to interpret the MAC CE correctly, and determine whether the quality report is provided, the second information is provided, neither of them, or both. By indicating whether the second information is being provided, the network node 110 is then enabled to interpret the MAC CE, read the second information, if provided, and make a decision on its connection with the user equipment.

In particular examples, sending the first indication in this Action 501 may be understood to make it possible to indicate AS RAI in Msg3 to the network node 110, with no need to extend the size of RRC and/or MAC layer, or reserve a new LCID.

Action 502

In some embodiments, the method may further comprise this Action 502. In this Action 502, the user equipment 130 may receive a second indication from the network node 110. The second indication may indicate whether or not the user equipment 130 is to be released from the network node 110. The second indication may be based on the sent first indication.

The second indication may indicate explicitly whether or not the user equipment 130 is to be released from the network node 110. The second indication may, for example indicate that no further transmission is expected in the UL and DL, or that only a single DL transmission is expected as a response to the transmission in the UL, or that multiple transmissions are expected in the UL and/or DL.

In some embodiments, the second indication may indicate an action taken or to be taken by the network node 110 with respect to a communication with the user equipment 130, e.g., a random access procedure.

For cases where the network node 110 may have determined that a connection may not be needed and/or desired, the second indication may indicate a release or indicate to not establish a connection. For cases where the network node 110 may have determined that a connection would be useful, the second indication may establish/setup/resume a/the connection between the user equipment 130 and the network node 110.

The receiving in this Action 502 may be performed, e.g., via the first link 141.

By receiving the second indication in this Action 502, the user equipment 130 may be understood to be enabled to use its resources, e.g., energy resources more efficiently, since if it has no data to send and it is expecting no subsequent receptions of data, it may be released by the network node 110. However, if it has indicated in Action 501, by sending the second information, that it is expecting subsequent transmissions, its connection with the network node 110 may continue to be established.

Embodiments of a method performed by a network node 110, will now be described with reference to the flowchart depicted in FIG. 6. The method is for receiving first information from the user equipment 130. The network node 110 and the user equipment may operate in the wireless communications network 100.

In some embodiments, the wireless communications network 100 may support at least one of: NR, LTE, LTE-M, eMTC, and NB-IoT.

The method may comprise one or more of the following actions. Several embodiments are comprised herein. In some embodiments, one action may be performed. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. A non-limiting example of the method performed by the network node 110 is depicted in FIG. 6. In FIG. 6, an optional action is represented with dashed lines.

The detailed description of some of the following corresponds to the same references provided above, in relation to the actions described for the user equipment 130, and will thus not be repeated here to simplify the description. For example, the quality report may be understood as a DL channel quality report. The channel may be, in non-limiting examples, e.g., PDCCH, nPDCCH, and/or mPDCCH.

Action 601

In this Action 601, the network node 110 receives the first indication from the user equipment 130. The first indication indicates whether or not the first information is being provided. The first information comprises at least one of: a) the quality report on the carrier used between the network node 110 and the user equipment 130 and b) the second information on subsequent transmissions from the user equipment 130 to the network node 110 or from the network node 110 to the user equipment 130. The first indication is comprised in the payload of the MAC CE described earlier.

The receiving in this Action 601 may be performed, e.g., via the first link 141.

The MAC CE may be comprised in the first uplink data channel during a random access procedure.

The MAC CE may be comprised in a MAC message PDU, e.g., in a Msg3 message.

In accordance with what has been described earlier in regards to Action 501, the MAC CE may comprise the first indication and at least one of: the quality report, and the second information.

In some embodiments, the receiving in this Action 601 may be performed in a Suspend state.

In some embodiments, the second information on subsequent transmissions may indicate at least one of: i) that no subsequent DL and UL data transmission is expected, ii) that a single subsequent DL transmission is expected, and iii) that multiple subsequent data transmissions are expected in the DL and/or in the UL.

In some embodiments, the second information may be AS RAI.

The first indication may comprise the first value and the second value.

In some embodiments, the first value may be the unassigned/available/spare value, and the second value may be the codepoint.

As described earlier, in some embodiments, at least one of the following may apply: a) an unassigned/available/spare value of 0 and a codepoint value of 0 may indicate that the second information on subsequent transmissions is not being sent, and only the quality report is being sent, b) an unassigned/available/spare value of 0 and a codepoint value different than 0 may indicate that both of the second information on subsequent transmissions and the quality report are being sent, and c) an unassigned/available/spare value of 1 may indicate that the second information on subsequent transmissions is being sent without a quality report.

However, as also explained earlier, it may be understood that other combinations of the first value and the second value may be similarly used to achieve the same purpose. For example, in some other examples, at least one of the following may apply: a) a first value of 0 and a second value different than 0 may indicate that the second information on subsequent transmissions is being sent without a quality report, b) a first value different than 0 and a second value different than 0 may indicate that both of the second information on subsequent transmissions and the quality report are being sent, c) a first value different than 0 and a second value of 0 may indicate that the second information on subsequent transmissions is not being sent, and only the quality report is being sent, and d) a first value of 0 and a second value of 0 indicate that neither the second information on subsequent transmissions nor the quality report is being sent.

In some examples, the quality report, for NB-IoT, may be a report on one of an anchor or non-anchor carriers used during a random access procedure.

In other examples, the quality report may be provided when in connected mode.

The receiving in this Action 601 may be performed in/during a Suspend/Resume procedure.

The receiving in this Action 601 may be performed when the user equipment 130 is suspended.

In other non-limiting examples, the receiving in this Action 601 may be performed in an Idle state and/or in an Inactive state.

Yet in other examples, the receiving in this Action 601 may be performed in a Connected state.

Action 602

In some embodiments, the method may comprise the following action. In this Action 602, the network node 110 may send the second indication to the user equipment 130. The second indication may indicate whether or not the user equipment 130 is to be released from the network node 110. The second indication may be based on the received first indication.

For cases where the network node 110 may have determined that a connection may not be needed and/or desired, the second indication may indicate a release or indicate to not establish a connection. For cases where the network node 110 may have determined that a connection would be useful, the second indication may establish/setup/resume a/the connection between the user equipment 130 and the network node 110.

The sending in this Action 603 may be performed, e.g., via the first link 141.

As an summarized overview of the foregoing, with the Early Data Transmission feature, there may be a contention-based transmission of the payload, that is, there may be a risk for collision with other UEs, which may lead to high numbers of retransmission and congestion upon high load in a cell. Embodiments herein may be understood to introduce a dynamic way to switch on and off the Early Data Transmission in a cell, e.g. depending on load, to avoid this drawback.

Certain embodiments disclosed herein may provide one or more of the following technical advantage(s), which may be summarized as follows. Embodiments herein, may be understood to make it possible to indicate AS RAI in Msg3 with no need to extend the size of RRC and/or MAC layer messages, or reserve a new LCID.

FIG. 7 depicts two different examples in panels a) and b), respectively, of the arrangement that the user equipment 130 may comprise to perform the method actions described above in relation to FIG. 5.

The user equipment 130 is for providing first information to the network node 110. That is, the user equipment 130 may be understood to be configured to provide the first information to the network node 110. The user equipment 130 and the network node 110 are configured to operate in the wireless communications network 100.

The wireless communications network 100 may be configured to support at least one of: NR, LTE, LTE-M, eMTC, and NB-IoT.

In some embodiments, the user equipment 130 may comprise the following arrangement depicted in FIG. 7a. Several embodiments are comprised herein. Components from one embodiment may be tacitly assumed to be present in another embodiment and it will be obvious to a person skilled in the art how those components may be used in the other exemplary embodiments. In FIG. 7, optional units are indicated with dashed boxes.

The detailed description of some of the following corresponds to the same references provided above, in relation to the actions described for the user equipment 130, and will thus not be repeated here. For example, the quality report may be understood as a DL channel quality report. The channel may be, in non-limiting examples, e.g., PDCCH, nPDCCH, and/or mPDCCH.

The user equipment 130 is configured to perform the sending of Action 501, e.g. by means of a sending unit 701 within the user equipment 130, configured to send the first indication to the network node 110. The first indication is configured to indicate whether or not the first information is being provided. The first information is configured to comprise at least one of: a) the quality report on the carrier configured to be used between the network node 110 and the user equipment 130 and b) the second information on subsequent transmissions from the user equipment 130 to the network node 110 or from the network node 110 to the user equipment 130. The first indication is configured to be comprised in the payload of the MAC CE. The sending unit 701 may be a processor 704 of the user equipment 130, or an application running on such processor.

The MAC CE may be configured to be comprised in the first uplink data channel during the random access procedure.

The MAC CE may be configured to be comprised in the Msg3 message.

The MAC CE may be configured to comprise the first indication and at least one of: the quality report, and the second information.

In some embodiments, to send may be configured to be performed in a Suspend state.

The second information on subsequent transmissions may be configured to indicate at least one of: i) that no subsequent downlink, DL, and uplink, UL data transmission is expected, ii) that a single subsequent DL transmission is expected, and iii) that multiple subsequent data transmissions are expected in the DL and/or in the UL.

The second information may be configured to be AS RAI.

The first indication may be configured to comprise the first value and the second value.

The first value may be configured to be an unassigned/available/spare value, and the second value may be configured to be a codepoint.

In some embodiments, at least one of the following may apply: a) an unassigned/available/spare value of 0 and a codepoint value of 0 are configured to indicate that the second information on subsequent transmissions is not being sent, and only the quality report is being sent, b) an unassigned/available/spare value of 0 and a codepoint value different than 0 are configured to indicate that both of the second information on subsequent transmissions and the quality report are being sent, and c) an unassigned/available/spare value of 1 is configured to indicate that the second information on subsequent transmissions is being sent without a quality report.

The user equipment 130 may be configured to perform the receiving of Action 502, e.g. by means of a receiving unit 702, configured to receive the second indication from the network node 110. The second indication may be configured to indicate whether or not the user equipment 130 is to be released from the network node 110. The second indication may be configured to be based on the first indication configured to be sent. The receiving unit 702 may be a processor 704 of the user equipment 130, or an application running on such processor.

Other units 703 may be comprised in the user equipment 130.

The embodiments herein in the user equipment 130 may be implemented through one or more processors, such as a processor 704 in the user equipment 130 depicted in FIG. 7a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the user equipment 130. One such carrier may be in the form of a CD ROM disc. It is however feasible with other data carriers such as a memory stick. The computer program code may furthermore be provided as pure program code on a server and downloaded to the user equipment 130.

The user equipment 130 may further comprise a memory 705 comprising one or more memory units. The memory 705 is arranged to be used to store obtained information, store data, configurations, schedulings, and applications etc. to perform the methods herein when being executed in the user equipment 130.

In some embodiments, the user equipment 130 may receive information from, e.g., the network node 110, through a receiving port 706. In some embodiments, the receiving port 706 may be, for example, connected to one or more antennas in user equipment 130.

In other embodiments, the user equipment 130 may receive information from another structure in the wireless communications network 100 through the receiving port 706. Since the receiving port 706 may be in communication with the processor 704, the receiving port 706 may then send the received information to the processor 704. The receiving port 706 may also be configured to receive other information.

The processor 704 in the user equipment 130 may be further configured to transmit or send information to e.g., the network node 110, or another structure in the wireless communications network 100, through a sending port 707, which may be in communication with the processor 704, and the memory 705.

Those skilled in the art will also appreciate that the different units 701-703 described above may refer to a combination of analog and digital modules, and/or one or more processors configured with software and/or firmware, e.g., stored in memory, that, when executed by the one or more processors such as the processor 704, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 701-703 described above may be implemented as one or more applications running on one or more processors such as the processor 704.

Thus, the methods according to the embodiments described herein for the user equipment 130 may be respectively implemented by means of a computer program 708 product, comprising instructions, i.e., software code portions, which, when executed on at least one processor 704, cause the at least one processor 704 to carry out the actions described herein, as performed by the user equipment 130. The computer program 708 product may be stored on a computer-readable storage medium 709. The computer-readable storage medium 709, having stored thereon the computer program 708, may comprise instructions which, when executed on at least one processor 704, cause the at least one processor 704 to carry out the actions described herein, as performed by the user equipment 130. In some embodiments, the computer-readable storage medium 709 may be a non-transitory computer-readable storage medium, such as a CD ROM disc, or a memory stick. In other embodiments, the computer program 708 product may be stored on a carrier containing the computer program 708 just described, wherein the carrier is one of an electronic signal, optical signal, radio signal, or the computer-readable storage medium 709, as described above.

The user equipment 130 may comprise a communication interface configured to facilitate communications between the user equipment 130 and other nodes or devices, e.g., the network node 110. The interface may, for example, include a transceiver configured to transmit and receive radio signals over an air interface in accordance with a suitable standard.

In other embodiments, the user equipment 130 may comprise the following arrangement depicted in FIG. 7b. The user equipment 130 may comprise a processing circuitry 704, e.g., one or more processors such as the processor 704, in the user equipment 130 and the memory 705. The user equipment 130 may also comprise a radio circuitry 710, which may comprise e.g., the receiving port 706 and the sending port 707. The processing circuitry 710 may be configured to, or operable to, perform the method actions according to FIG. 5, in a similar manner as that described in relation to FIG. 7*a*. The radio circuitry 710 may be configured to set up and maintain at least a wireless connection with the network node 110. Circuitry may be understood herein as a hardware component.

Figure 5:
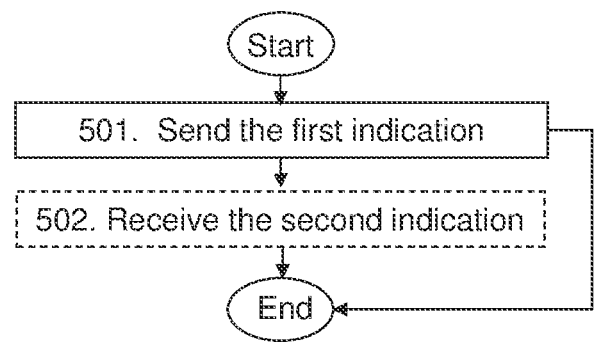
FIG. 5 is a flowchart depicting a method in a user equipment, according to embodiments herein.

Hence, embodiments herein also relate to the user equipment 130 comprising the processing circuitry 704 and the memory 705, said memory 705 containing instructions executable by said processing circuitry 704, whereby the user equipment 130 is operative to perform the actions described herein in relation to the user equipment 130, e.g., in FIG. 5.

FIG. 8 depicts two different examples in panels a) and b), respectively, of the arrangement that the network node 110 may comprise to perform the method actions described above in relation to FIG. 6.

The network node 110 is for receiving first information from the user equipment 130. That is, the network node 110 may be understood to be configured to receive the first information from the user equipment 130. The network node 110 and the user equipment 130 are configured to operate in the wireless communications network 100.

The wireless communications network 100 may be configured to support at least one of: NR, LTE, LTE-M, eMTC, and NB-IoT.

In some embodiments, the network node 110 may comprise the following arrangement depicted in FIG. 8*a*.

Several embodiments are comprised herein. Components from one embodiment may be tacitly assumed to be present in another embodiment and it will be obvious to a person skilled in the art how those components may be used in the other exemplary embodiments. In FIG. 8, optional modules are indicated with dashed boxes.

The detailed description of some of the following corresponds to the same references provided above, in relation to the actions described for the network node 110, and will thus not be repeated here. For example, the quality report may be understood as a DL channel quality report. The channel may be, in non-limiting examples, e.g., PDCCH, nPDCCH, and/or mPDCCH.

The network node 110 is configured to perform the receiving of Action 601, e.g. by means of a receiving unit 801 within the network node 110, configured to perform receive the first indication from the user equipment 130. The first indication is configured to indicate whether or not the first information is being provided. The first information is configured to comprise at least one of: a) the quality report on the carrier used between the network node 110 and the user equipment 130 and b) the second information on subsequent transmissions from the user equipment 130 to the network node 110 or from the network node 110 to the user equipment 130. The first indication is configured to be comprised in the payload of the MAC CE. The receiving unit 801 may be a processor 804 of the network node 110, or an application running on such processor.

The MAC CE may be configured to be comprised in the first uplink data channel during the random access procedure.

The MAC CE may be configured to be comprised in the Msg3 message.

The MAC CE may be configured to comprise the first indication and at least one of: the quality report, and the second information.

In some embodiments, to receive may be configured to be performed in a Suspend state.

The second information on subsequent transmissions may be configured to indicate at least one of: i) that no subsequent downlink, DL, and uplink, UL data transmission is expected, ii) that a single subsequent DL transmission is expected, and iii) that multiple subsequent data transmissions are expected in the DL and/or in the UL.

The second information may be configured to be AS RAI.

The first indication may be configured to comprise the first value and the second value.

The first value may be configured to be an unassigned/available/spare value, and the second value may be configured to be a codepoint.

In some embodiments, at least one of the following may apply: a) an unassigned/available/spare value of 0 and a codepoint value of 0 are configured to indicate that the second information on subsequent transmissions is not being sent, and only the quality report is being sent, b) an unassigned/available/spare value of 0 and a codepoint value different than 0 are configured to indicate that both of the second information on subsequent transmissions and the quality report are being sent, and c) an unassigned/available/spare value of 1 is configured to indicate that the second information on subsequent transmissions is being sent without a quality report.

The network node 110 may be configured to perform the sending of Action 602, e.g. by means of a sending unit 802 within the network node 110, configured to send the second indication to the user equipment 130. The second indication may be configured to indicate whether or not the user equipment 130 is to be released from the network node 110. The second indication may be configured to be based on the first indication configured to be received. The sending unit 802 may be a processor 804 of the network node 110, or an application running on such processor.

Other units 803 may be comprised in the network node 110.

The embodiments herein in the network node 110 may be implemented through one or more processors, such as a processor 804 in the network node 110 depicted in FIG. 8*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 805 comprising one or more memory units. The memory 805 is arranged to be used to store obtained information, store data, configurations, schedulings, and applications etc. to perform the methods herein when being executed in the network node 110.

In some embodiments, the network node 110 may receive information from, e.g., the user equipment 130, through a receiving port 806. In some embodiments, the receiving port 806 may be, for example, connected to one or more antennas in network node 110. In other embodiments, the network node 110 may receive information from another structure in the wireless communications network 100 through the receiving port 806. Since the receiving port 806 may be in communication with the processor 804, the receiving port 806 may then send the received information to the processor 804. The receiving port 806 may also be configured to receive other information.

The processor 804 in the network node 110 may be further configured to transmit or send information to e.g., the user equipment 130, or another structure in the wireless communications network 100, through a sending port 807, which may be in communication with the processor 804, and the memory 805.

Those skilled in the art will also appreciate that the different units 801-803 described above may refer to a combination of analog and digital modules, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 801-803 described above may be implemented as one or more applications running on one or more processors such as the processor 804.

Thus, the methods according to the embodiments described herein for the network node 110 may be respectively implemented by means of a computer program 808 product, comprising instructions, i.e., software code portions, which, when executed on at least one processor 804, cause the at least one processor 804 to carry out the actions described herein, as performed by the network node 110. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the network node 110. In some embodiments, the computer-readable storage medium 809 may be a non-transitory computer-readable storage medium, such as a CD ROM disc, or a memory stick. In other embodiments, the computer program 808 product may be stored on a carrier containing the computer program 808 just described, wherein the carrier is one of an electronic signal, optical signal, radio signal, or the computer-readable storage medium 809, as described above.

The network node 110 may comprise a communication interface configured to facilitate communications between the network node 110 and other nodes or devices, e.g., the user equipment 130. The interface may, for example, include a transceiver configured to transmit and receive radio signals over an air interface in accordance with a suitable standard.

In other embodiments, the network node 110 may comprise the following arrangement depicted in FIG. 8b. The network node 110 may comprise a processing circuitry 804, e.g., one or more processors such as the processor 804, in the network node 110 and the memory 805. The network node 110 may also comprise a radio circuitry 810, which may comprise e.g., the receiving port 806 and the sending port 807. The processing circuitry 804 may be configured to, or operable to, perform the method actions according to FIG. 6, in a similar manner as that described in relation to FIG. 8a. The radio circuitry 810 may be configured to set up and maintain at least a wireless connection with the user equipment 130. Circuitry may be understood herein as a hardware component.

Figure 6:
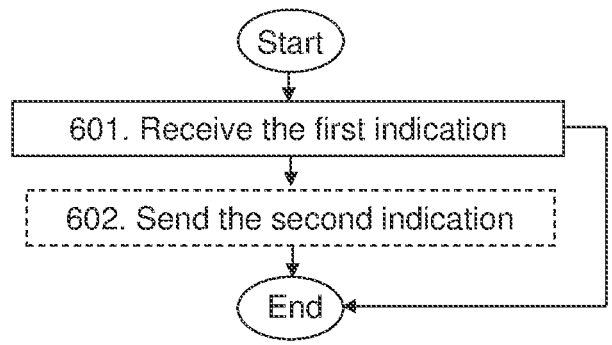
FIG. 6 is a flowchart depicting a method in a network node, according to embodiments herein.

Hence, embodiments herein also relate to the network node 110 comprising the processing circuitry 804 and the memory 805, said memory 805 containing instructions executable by said processing circuitry 804, whereby the network node 110 is operative to perform the actions described herein in relation to the network node 110, e.g., in FIG. 6.

Embodiments herein may be related to NR, LTE, LTE-M, eMTC, NB-IoT, Msg3, networked society, random access, early data transmission, suspend/resume, release assistance indicator.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Further Extensions and Variations

Figure 9:
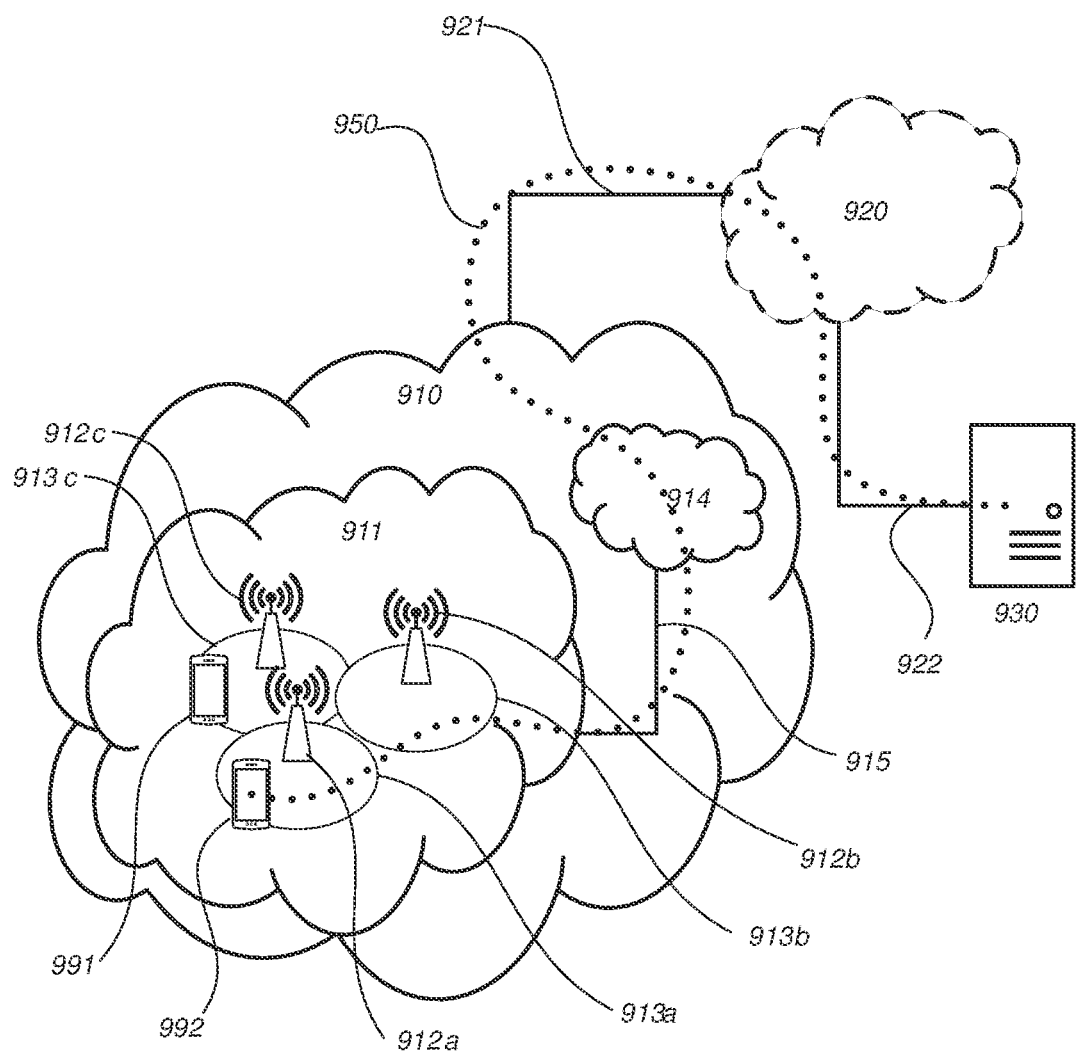
FIG. 9 is a schematic block diagram illustrating a telecommunication network connected via an intermediate network to a host computer, according to embodiments herein.

FIG. 9: Telecommunication Network Connected Via an Intermediate Network to a Host Computer in Accordance with Some Embodiments With reference to FIG. 9, in accordance with an embodiment, a communication system includes telecommunication network 910 such as the wireless communications network 100, for example, a 3GPP-type cellular network, which comprises access network 911, such as a radio access network, and core network 914. Access network 911 comprises a plurality of network nodes such as the network node 110. For example, base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A plurality of user equipments, such as the user equipment 130 are comprised in the wireless communications network 100. In FIG. 9, a first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912. Any of the UEs 991, 992 are examples of the user equipment 130.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more subnetworks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signalling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

In relation to FIGS. 10, 11, 12, 13, and 14, which are described next, it may be understood that a UE is an example of the user equipment 130, and that any description provided for the UE equally applies to the user equipment 130. It may be also understood that the base station is an example of the network node 110, and that any description provided for the base station equally applies to the network node 110.

Figure 10:
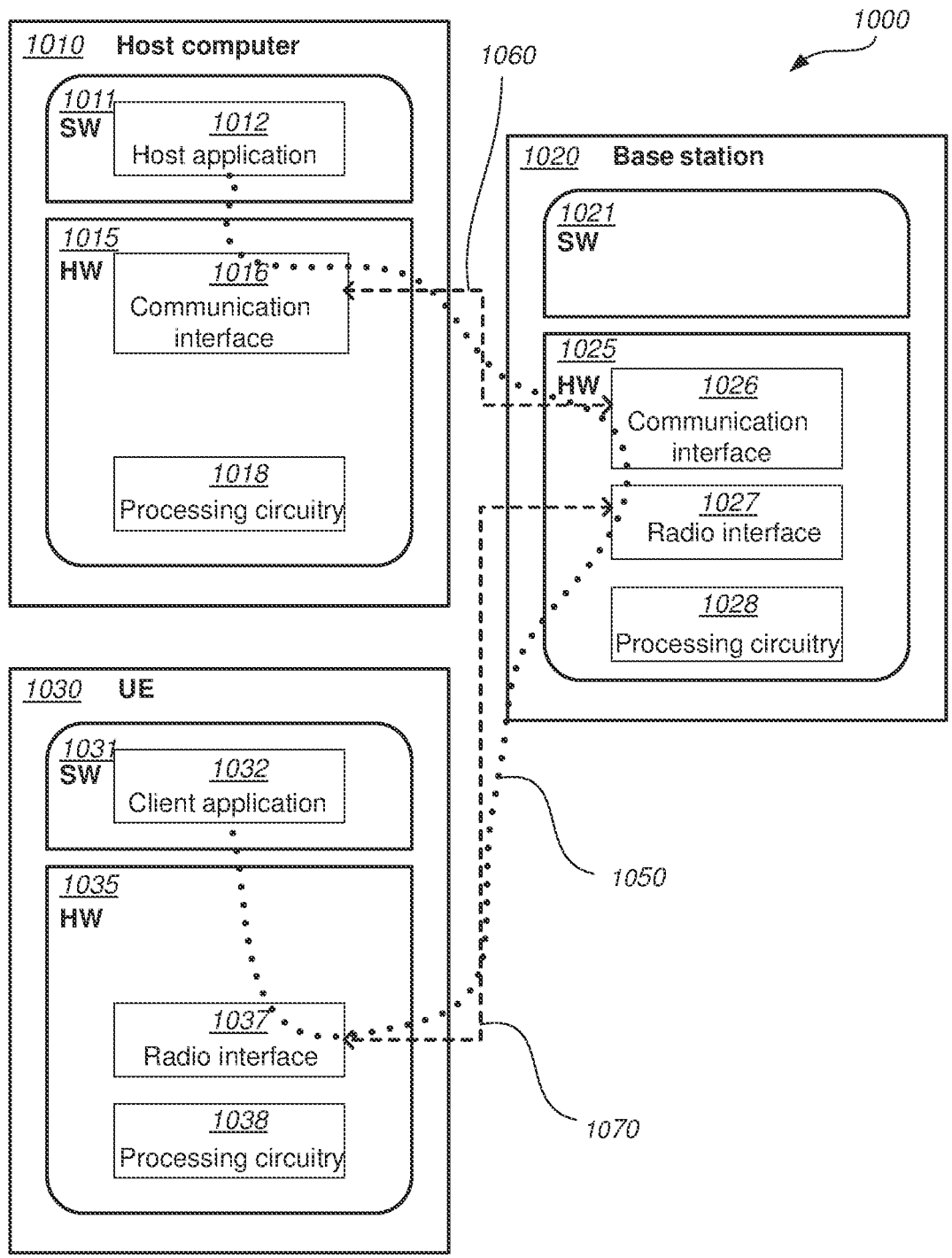
FIG. 10 is a generalized block diagram of a host computer communicating via a base station with a user equipment over a partially wireless connection, according to embodiments herein.

FIG. 10: Host Computer Communicating Via a Base Station with a User Equipment Over a Partially Wireless Connection in Accordance with Some Embodiments Example implementations, in accordance with an embodiment, of the user equipment 130, e.g., a UE, the network node 110, e.g., a base station and host computer discussed in the preceding paragraphs will now be described with reference to FIG. 10. In communication system 1000, such as the wireless communications network 100, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes the network node 110, exemplified in FIG. 10 as a base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with the user equipment 130, exemplified in FIG. 10 as a UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signalling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

The user equipment 130 embodiments relate to FIG. 5, FIG. 7, and FIGS. 9-14.

The user equipment 130 may also be configured to communicate user data with a host application unit in a host computer 1010, e.g., via another link such as 1060.

The user equipment 130 may comprise an interface unit to facilitate communications between the user equipment 130 and other nodes or devices, e.g., the network node 110, the host computer 1010, or any of the other nodes. In some particular examples, the interface may, for example, include a transceiver configured to transmit and receive radio signals over an air interface in accordance with a suitable standard.

The user equipment 130 may comprise an arrangement as shown in FIG. 7 or in FIG. 10.

The network node 110 embodiments relate to FIG. 6, FIG. 8 and FIGS. 9-14.

The network node 110 may also be configured to communicate user data with a host application unit in a host computer 1010, e.g., via another link such as 1060.

The network node 110 may comprise an interface unit to facilitate communications between the network node 110 and other nodes or devices, e.g., the user equipment 130, the host computer 1110, or any of the other nodes. In some particular examples, the interface may, for example, include a transceiver configured to transmit and receive radio signals over an air interface in accordance with a suitable standard.

The network node 110 may comprise an arrangement as shown in FIG. 8 or in FIG. 10.

FIG. 11: Methods Implemented in a Communication System Including a Host Computer, a Base Station and a User Equipment in Accordance with Some Embodiments FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

FIG. 12: Methods Implemented in a Communication System Including a Host Computer, a Base Station and a User Equipment in Accordance with Some Embodiments FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
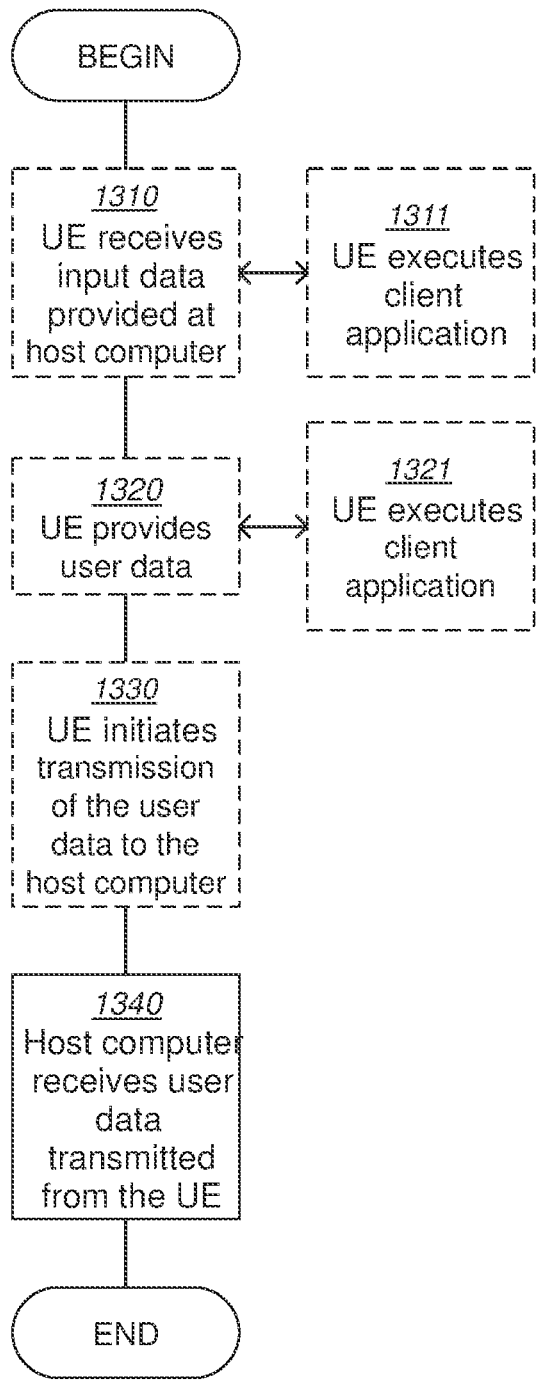
FIG. 13 is a flowchart depicting embodiments of a method in a communications system including a host computer, a base station and a user equipment, according to embodiments herein.

FIG. 13: Methods Implemented in a Communication System Including a Host Computer, a Base Station and a User Equipment in Accordance with Some Embodiments FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
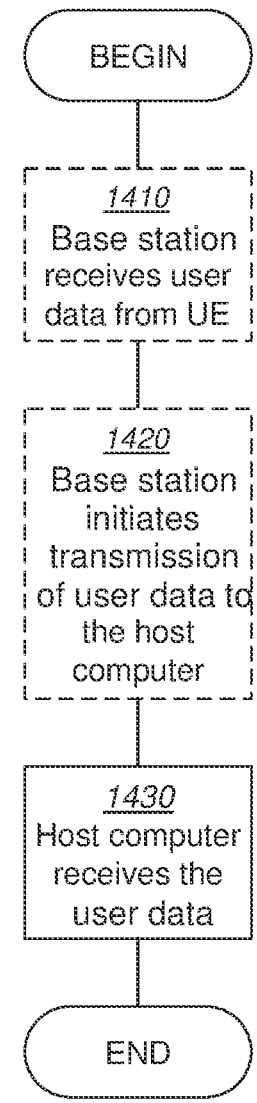
FIG. 14 is a flowchart depicting embodiments of a method in a communications system including a host computer, a base station and a user equipment, according to embodiments herein.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the network node 110.

5. A communication system including a host computer comprising:
 processing circuitry configured to provide user data; and
 a communication interface configured to forward the user data to a cellular network for transmission to a user equipment (UE),
 wherein the cellular network comprises a base station having a radio interface and processing circuitry, the base station's processing circuitry configured to perform one or more of the actions described herein as performed by the network node 110.

6. The communication system of embodiment 5, further including the base station.

7. The communication system of embodiment 6, further including the UE, wherein the UE is configured to communicate with the base station.

8. The communication system of embodiment 7, wherein:
 the processing circuitry of the host computer is configured to execute a host application, thereby providing the user data; and
 the UE comprises processing circuitry configured to execute a client application associated with the host application.

11. A method implemented in a base station, comprising one or more of the actions described herein as performed by the network node 110.

15. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the base station performs one or more of the actions described herein as performed by the network node 110.

16. The method of embodiment 15, further comprising:
 at the base station, transmitting the user data.

17. The method of embodiment 16, wherein the user data is provided at the host computer by executing a host application, the method further comprising:
 at the UE, executing a client application associated with the host application.

21. A user equipment (UE) configured to communicate with a base station, the UE comprising a radio interface and processing circuitry configured to perform one or more of the actions described herein as performed by the user equipment 130.

25. A communication system including a host computer comprising:
 processing circuitry configured to provide user data; and
 a communication interface configured to forward user data to a cellular network for transmission to a user equipment (UE),
 wherein the UE comprises a radio interface and processing circuitry, the UE's processing circuitry configured to perform one or more of the actions described herein as performed by the user equipment 130.

26. The communication system of embodiment 25, further including the UE.

27. The communication system of embodiment 26, wherein the cellular network further includes a base station configured to communicate with the UE.

28. The communication system of embodiment 26 or 27, wherein:
 the processing circuitry of the host computer is configured to execute a host application, thereby providing the user data; and
 the UE's processing circuitry is configured to execute a client application associated with the host application.

31. A method implemented in a user equipment (UE), comprising one or more of the actions described herein as performed by the user equipment 130.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the user equipment 130.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the user equipment 130.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the user equipment 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the user equipment 130.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the user equipment 130.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by the network node 110.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the user equipment 130.

76. The method of embodiment 75, further comprising:
at the base station, receiving the user data from the UE.

77. The method of embodiment 76, further comprising:
at the base station, initiating a transmission of the received user data to the host computer.

REFERENCES

[1] TS 36.300, Evolved Universal Terrestrial Radio Access (E-UTRA) and Evolved Universal Terrestrial Radio Access Network (E-UTRAN); Overall description; Stage 2, 15.4.0, 2019 Jan. 15.

The invention claimed is:
1. A method performed by a user equipment for providing first information to a network node, the user equipment and the network node operating in a wireless communications network, the method comprising:
sending a first indication to the network node, the first indication indicating whether or not first information is being provided, the first information comprising a second information on subsequent transmissions from the user equipment to the network node or from the network node to the user equipment, the first indication being comprised in a payload of a Medium Access Control (MAC) control element (CE), wherein:

the second information on subsequent transmissions indicates that a single subsequent DL transmission is expected or that multiple subsequent data transmissions are expected in the DL and/or in the UL;

the first indication comprises a first value and a second value;

the first value is an unassigned/available/spare value, and wherein the second value is a codepoint; and an unassigned/available/spare value of 0 and a codepoint value of 0 indicate that the second information on subsequent transmissions is not being sent, and only a quality report is being sent.

2. The method according to claim 1, wherein the MAC CE is comprised in a first uplink data channel during a random access procedure.

3. The method according to claim 2, wherein the MAC CE is comprised in a Msg3 message.

4. The method according to claim 1, wherein the MAC CE comprises the first indication and the second information.

5. The method according to claim 1, wherein the sending is performed in a Suspend state.

6. The method according to claim 1, wherein the second information is Access Stratum Release Assistance Information (AS RAI).

7. The method according to claim 1, wherein the first indication comprises a first value and a second value.

8. The method according to claim 7, wherein the first value is an unassigned/available/spare value, and wherein the second value is a codepoint.

9. The method according to claim 1, wherein the method further comprises:

receiving a second indication from the network node, the second indication indicating whether or not the user equipment is to be released from the network node, the second indication being based on the sent first indication.

10. The method according to claim 1, wherein the wireless communications network supports at least one of: New Radio (NR), Long Term Evolution (LTE), LTE Machine Type Communication (LTE-M), enhanced Machine Type Communication (eMTC), and Narrow Band Internet of Things (NB-IOT).

11. A method performed by a network node for receiving first information from a user equipment, the network node and the user equipment operating in a wireless communications network, the method comprising:

receiving a first indication from the user equipment, the first indication indicating whether or not first information is being provided, the first information comprising a second information on subsequent transmissions from the user equipment to the network node or from the network node to the user equipment, the first indication being comprised in a payload of a Medium Access Control (MAC) control element (CE), wherein:

the second information on subsequent transmissions indicates that a single subsequent DL transmission is expected or that multiple subsequent data transmissions are expected in the DL and/or in the UL;

the first indication comprises a first value and a second value;

the first value is an unassigned/available/spare value, and wherein the second value is a codepoint; and an unassigned/available/spare value of 0 and a codepoint value different than 0 indicate that both of the second information on subsequent transmissions and a quality report are being sent.

12. The method according to claim 11, wherein the MAC CE is comprised in a first uplink data channel during a random access procedure.

13. The method according to claim 12, wherein the MAC CE is comprised in a Msg3 message.

14. The method according to claim 11, wherein the MAC CE comprises the first indication and the second information.

15. The method according to claim 11, wherein the receiving is performed in a Suspend state.

16. The method according to claim 11, wherein the second information is Access Stratum Release Assistance Information (AS RAI).

17. The method according to claim 11, wherein the first indication comprises a first value and a second value.

18. A user equipment for providing first information to a network node, the user equipment and the network node being configured to operate in a wireless communications network, the user equipment comprising:

processing circuitry; and memory coupled with the processing circuitry, wherein the memory includes instructions that when executed by the processing circuitry causes the user equipment to perform operations comprising:

send a first indication to the network node, the first indication being configured to indicate whether or not first information is being provided, the first information being configured to comprise a second information on subsequent transmissions from the user equipment to the network node or from the network node to the user equipment, the first indication being configured to be comprised in a payload of a Medium Access Control (MAC) control element (CE), wherein:

the second information on subsequent transmissions indicates that a single subsequent DL transmission is expected or that multiple subsequent data transmissions are expected in the DL and/or in the UL;

the first indication comprises a first value and a second value;

the first value is an unassigned/available/spare value, and wherein the second value is a codepoint; and an unassigned/available/spare value of 1 indicates that the second information on subsequent transmissions is being sent without a quality report.

19. A network node for receiving first information from a user equipment, the network node and the user equipment being configured to operate in a wireless communications network, the network node comprising:

processing circuitry; and memory coupled with the processing circuitry, wherein the memory includes instructions that when executed by the processing circuitry causes the network node to perform operations comprising:

receive a first indication from the user equipment, the first indication being configured to indicate whether or not first information is being provided, the first information being configured to comprise a second information on subsequent transmissions from the user equipment to the network node or from the network node to the user equipment, the first indication being configured to be comprised in a payload of a Medium Access Control (MAC) control element (CE), wherein:

the second information on subsequent transmissions indicates that a single subsequent DL transmission is expected or that multiple subsequent data transmissions are expected in the DL and/or in the UL;

the first indication comprises a first value and a second value;

the first value is an unassigned/available/spare value, and wherein the second value is a codepoint; and at least one of:
   a. an unassigned/available/spare value of 0 and a codepoint value of 0 indicate that the second information on subsequent transmissions is not being sent, and only a quality report is being sent,
   b. an unassigned/available/spare value of 0 and a codepoint value different than 0 indicate that both of the second information on subsequent transmissions and a quality report are being sent, and
   c. an unassigned/available/spare value of 1 indicates that the second information on subsequent transmissions is being sent without a quality report.

20. A method performed by a user equipment for providing first information to a network node, the user equipment and the network node operating in a wireless communications network, the method comprising:

sending a first indication to the network node, the first indication indicating whether or not first information is being provided, the first information comprising at least one of: a) a quality report on a carrier used between the network node and the user equipment and b) a second information on subsequent transmissions from the user equipment to the network node or from the network node to the user equipment, the first indication being comprised in a payload of a Medium Access Control (MAC) control element (CE), wherein:

the second information on subsequent transmissions indicates that a single subsequent DL transmission is expected or that multiple subsequent data transmissions are expected in the DL and/or in the UL;

the first indication comprises a first value and a second value;

the first value is an unassigned/available/spare value, and wherein the second value is a codepoint; and at least one of:
   a. an unassigned/available/spare value of 0 and a codepoint value of 0 indicate that the second information on subsequent transmissions is not being sent, and only the quality report is being sent,
   b. an unassigned/available/spare value of 0 and a codepoint value different than 0 indicate that both of the second information on subsequent transmissions and the quality report are being sent, and
   c. an unassigned/available/spare value of 1 indicates that the second information on subsequent transmissions is being sent without a quality report.

\* \* \* \* \*